(12) United States Patent
Mazzaro et al.

(10) Patent No.: US 9,476,973 B2
(45) Date of Patent: Oct. 25, 2016

(54) COMBINED RADAR ASSEMBLY WITH LINEAR AND NONLINEAR RADAR

(71) Applicant: U.S. Army Research Laboratory, Adelphi, MD (US)

(72) Inventors: Gregory J Mazzaro, Charleston, SC (US); Kelly D. Sherbondy, Burke, VA (US); DaHan Liao, Bethesda, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 505 days.

(21) Appl. No.: 14/032,387

(22) Filed: Sep. 20, 2013

(65) Prior Publication Data
US 2015/0084811 A1    Mar. 26, 2015

(51) Int. Cl.
| | |
|---|---|
| G01S 13/04 | (2006.01) |
| G01V 3/12 | (2006.01) |
| G01S 13/34 | (2006.01) |
| G01S 13/87 | (2006.01) |
| G01S 13/88 | (2006.01) |
| G01S 13/10 | (2006.01) |

(52) U.S. Cl.
CPC .............. *G01S 13/04* (2013.01); *G01S 13/343* (2013.01); *G01S 13/87* (2013.01); *G01S 13/885* (2013.01); *G01V 3/12* (2013.01); *G01S 13/106* (2013.01)

(58) Field of Classification Search
CPC .... G01S 13/106; G01S 13/885; G01S 13/87; G01S 13/343; G01S 13/04; G01V 3/12
See application file for complete search history.

(56) References Cited

U.S. PATENT DOCUMENTS

| | | | |
|---|---|---|---|
| 3,914,762 A | * | 10/1975 | Klensch ............... B61L 25/045 340/10.1 |
| 6,163,259 A | | 12/2000 | Barsumian et al. |
| 6,856,275 B1 | | 2/2005 | Ehlers et al. |
| 6,897,777 B2 | | 5/2005 | Holmes |
| 7,830,299 B2 | | 11/2010 | Steele et al. |
| 7,864,107 B1 | | 1/2011 | Letola |
| 8,063,813 B1 | | 11/2011 | Keller et al. |
| 8,131,239 B1 | | 3/2012 | Walker et al. |

(Continued)

OTHER PUBLICATIONS

J. L. Osborne, et al., "A landscape-scale study of bumble bee foraging range and constancy, using harmonic radar," J. Appl. Ecol., vol. 36, No. 4, pp. 519-533, Sep. 1999.

(Continued)

*Primary Examiner* — Matthew M Barker
(74) *Attorney, Agent, or Firm* — Lawrence E. Anderson

(57) ABSTRACT

A radar assembly for linear and nonlinear radar transmission and reception comprising a signal generator; at least one filter operatively connected to the signal generator; a transmitter operatively connected to the at least one filter for transmitting radar signals; a receiver operative to receiving received signals comprising linear and nonlinear responses from the reflected transmitted signals; the receiver comprising a first channel for processing the linear response of the received signal; a second channel for the processing the nonlinear response of the received signal; at least one switch operative to select one of the first or second channels; at least one high pass filter operatively connected to the second channel to attenuate the linear response; at least one amplifier to amplify the nonlinear response; and at least one display operatively connected to both the first and second channels for displaying both linear and nonlinear responses.

20 Claims, 22 Drawing Sheets

Combined linear and nonlinear radar architecture: a preferred embodiment implementation

(56) References Cited

U.S. PATENT DOCUMENTS

2010/0286514 A1* 11/2010 Leighton ............... G01S 7/292
  600/437
2014/0313071 A1* 10/2014 McCorkle ............... G01S 7/28
  342/202

OTHER PUBLICATIONS

J. Kiriazi, J. Nakakura, K. Hall, N. Hafner, and V. Lubecke, "Low profile harmonic radar transponder for tracking small endangered species," in Proc. 29th Int. Conf. IEEE Eng. Med. Bio. Soc., pp. 2338-2341, Aug. 2007, p. vol. 48, No. 2.

I. Waldron and S. N. Makarov, "Measurement of dielectric permittivity and loss tangent for bulk foam samples with suspended ring resonator method," in Proc. IEEE Ant. Prop. Soc. Int. Symp., pp. 3175-3178, Jul. 2006.

F. H. Drake, G. W. Pierce, and M. T. Dow, "Measurement of the dielectric constant and index of refraction of water and aqueous solutions of KCl at high frequencies," Phys. Rev., vol. 35, No. 6, pp. 613-622, Mar. 1930.

F. Arazm and F. A. Benson, "Nonlinearities in metal contacts at microwave frequencies," IEEE Trans. Electromagn. Compat., vol. 22, No. 3, pp. 142-149, Aug. 1980.

J. R. Wilkerson, P. G. Lam, K. G. Gard, and M. B. Steer, "Distributed passive intermodulation distortion on transmission lines," IEEE Trans. Microw. Theory Tech., vol. 59, No. 5, pp. 1190-1205, May 2011.

P. L. Lui and A. D. Rawlins, "Passive non-linearities in antenna systems," in Proc. IEE Colloq. Passive Intermod. Prod. Ant. Related Struct., pp. 1-7, Jun. 1989.

G. J. Mazzaro, M. B. Steer, and K. G. Gard, "Intermodulation distortion in narrowband amplifier circuits," IET Microw. Antennas Propagat., vol. 4, No. 9, pp. 1149-1156, Sep. 2010.

J. Henrie, A. Christianson, and W. J. Chappell, "Prediction of passive intermodulation from coaxial connectors in microwave networks," IEEE Trans. Microw. Theory Tech., vol. 56, No. 1, pp. 209-216, Jan. 2008.

G. C. Bailey and A. C. Ehrlich, "A study of RF nonlinearities in nickel," J. Appl. Phys., vol. 50, No. 1, pp. 453-461, Jan. 1979.

V. Polacek and R. Pavlik, "The use of digital modulation signals in radar system for detection of nonlinear scatterers," in Proc. Int. Radar Symp., IRS, pp. 743-747, Sep. 2011.

F. Crowne and C. Fazi, "Nonlinear radar signatures from metal surfaces," in Proc. Int. Radar Conf., RADAR, pp. 1-6, Oct. 2009.

K. Ranney, et al., "Recent MTI experiments using ARL's Synchronous Impulse Reconstruction (SIRE) radar," in Proc. SPIE, pp. 694708(1-9), Apr. 2008.

R. D. Brazee, et al., "A transponder for harmonic radar tracking of the black vine weevil in behavioral research," Trans. Amer. Soc. Agricult. Eng., vol. 48, No. 2, pp. 831-838, 2005.

B. G. Colpitts and G. Boiteau, "Harmonic radar transceiver design: Miniature tags for insect tracking," IEEE Trans. Antennas Propag., vol. 52, No. 11, pp. 2825-2832, Nov. 2004.

M. E. O'Neal, D. A. Landis, E. Rothwell, L. Kempel, and D. Reinhard, "Tracking insects with harmonic radar: A case study," Amer. Ento., vol. 50, No. 4, pp. 212-218, 2004.

D. Psychoudakis, W. Moulder, C. C. Chen, H. Zhu, and J. L. Volakis, "A portable low-power harmonic radar system and conformal tag for insect tracking," IEEE Antennas Wireless Propag. Lett., vol. 7, pp. 444-447, 2008.

N. Tahir and G. Brooker, "Recent developments and recommendations for improving harmonic radar tracking systems," in Proc. 5th European Conf. Ant. Propagat., EUCAP, pp. 1531-1535, Apr. 2011.

A. Singh and V. Lubecke, "Respiratory monitoring and clutter rejection using a CW Doppler radar with passive RF tags," IEEE Sensors, vol. 12, No. 3, pp. 558-565, Mar. 2012.

C. Stagner, A. Conrad, C. Osterwise, D. G. Beetner, and S. Grant, "A practical superheterodyne-receiver detector using stimulated emissions," IEEE Trans. Instrum. Meas., vol. 60, No. 4, pp. 1461-1468, Apr. 2011.

J. Saebboe, et al., "Harmonic automotive radar for VRU classification," in Proc. Int. Radar Conf., RADAR, pp. 1-5, Oct. 2009.

A. F. F Martone and E. J. Delp, "Characterization of RF devices using two-tone probe signals," in Proc. 14th Workshop on Stat. Sig. Process., IEEE/SP, pp. 161-165, Aug. 2007.

R. G. Lyons, "Signal and interference output of a bandpass nonlinearity," IEEE Trans. Commun., vol. 27, No. 6, pp. 888-891, Jun. 1979.

M. Ressler, L. Nguyen, F. Koenig, D. Wong, and G. Smith, "The Army Research Laboratory (ARL) Synchronous Impulse Reconstruction (SIRE) forward-looking radar," in Proc. SPIE, pp. 656105(1-12), Apr. 2007.

H. Lev-Ari and A. J. Devaney, "The time-reversal technique reinterpreted: Subspace-based signal processing for multi-static target location," in Proc. IEEE Sensor Array and Multichannel Signal Processing Workshop, pp. 509-513, 2000.

A. Marione, K. Ranney, and R. Innocenti, "Through-the-wall detection of slow-moving personnel," in Proc. SPIE, pp. 73080Q(1-12), Apr. 2009.

J. A. Kosinski, W. D. Palmer, and M. B. Steer, "Unified understanding of RF remote probing," IEEE Sensors, vol. 11, No. 12, pp. 3055-3063, Dec. 2011.

D. J. Daniels and C. Martel, "Radar technology for mine detection," in 31st Eur. Microw. Conf., pp. 1-10, Sep. 2001.

L. Mu, T. Xiangqian, S. Ming, and Y. Jun, "Research on key technologies for collision avoidance automotive radar," in IEEE Intell. Vehicles Symp., pp. 233-236, Jun. 2009.

* cited by examiner

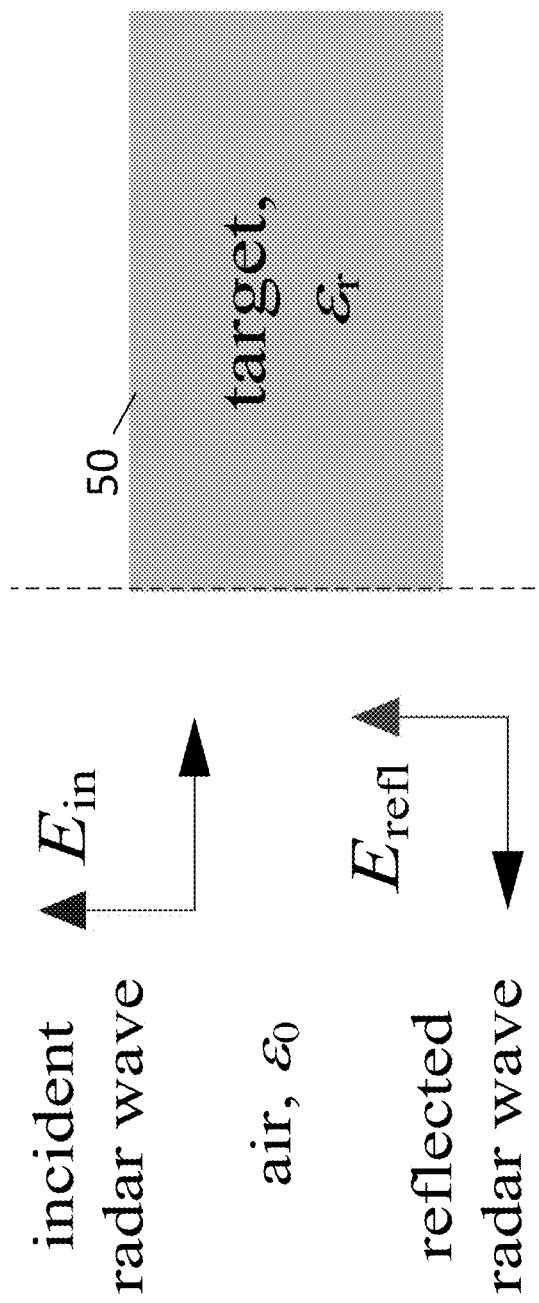
FIG. 1  Incident and reflected radar waves for propagation normal to target.

Linear radar waveform: Stepped-frequency.

Linear radar waveform: impulse

Nonlinear radar waveforms: (a) single-tone CW, (b) two-tone CW.

Combined linear and nonlinear radar architecture: a preferred embodiment implementation.

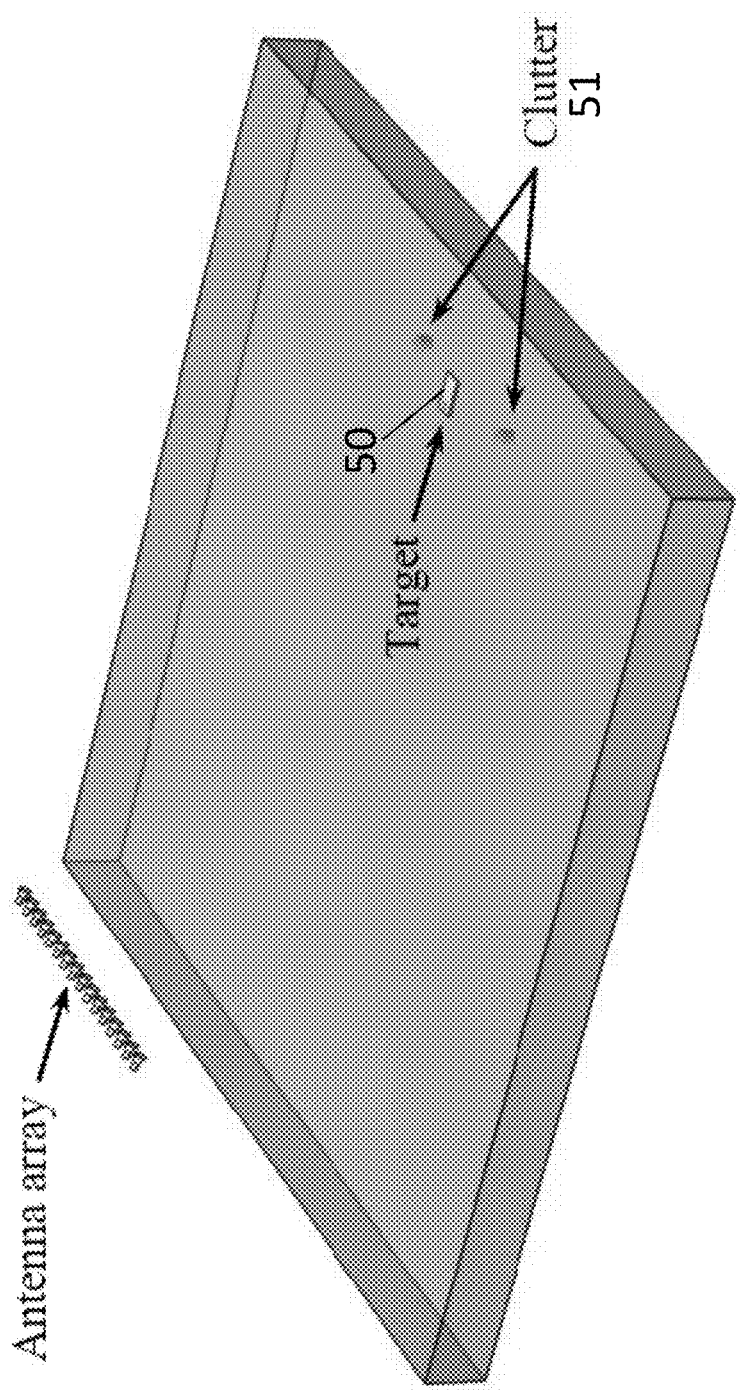
FIG. 5A Imaging results for a nonlinear buried target: scene containing target and two (linear) clutter objects.

Combined radar for the detection of threats containing both linear and nonlinear components.
A picture of the Synchronous Impulse Reconstruction (SIRE) radar mounted on a vehicle is provided.

FIG. 7 Single-tone RF pulse output by AWG: $f_{pulse} = 900$ MHz, $P_{env} = 0$ dBm, $T_{env} = 1$ μs, $D_c = 10\%$.

FIG. 8 Multitone RF pulse output by AWG: $N = 2$ tones, $f_c = 890$ MHz, $P_{tone} = -6$ dBm per tone, $T_{env} = 2$ μs, $D_c = 20\%$.

FIG. 9 Linear FM chirp pulse output by AWG:
$f_{start} = 860$ MHz, $f_{end} = 900$ MHz, $P_{env} = -3$ dBm, $T_{env} = 4$ μs, $D_c = 50\%$.

FIG. 10 Stepped-frequency pulse output by AWG: $f_{start}$ = 870 MHz, $f_{end}$ = 890 MHz, $\Delta f$ = 1 MHz, $P_{env}$ = 0 dBm, $T_{env}$ = 2.5 µs, $D_c$ = 25%.

FIG. 12    Transmitter amplifier and lowpass filters.

Directional coupler and linear/nonlinear receiver chain.

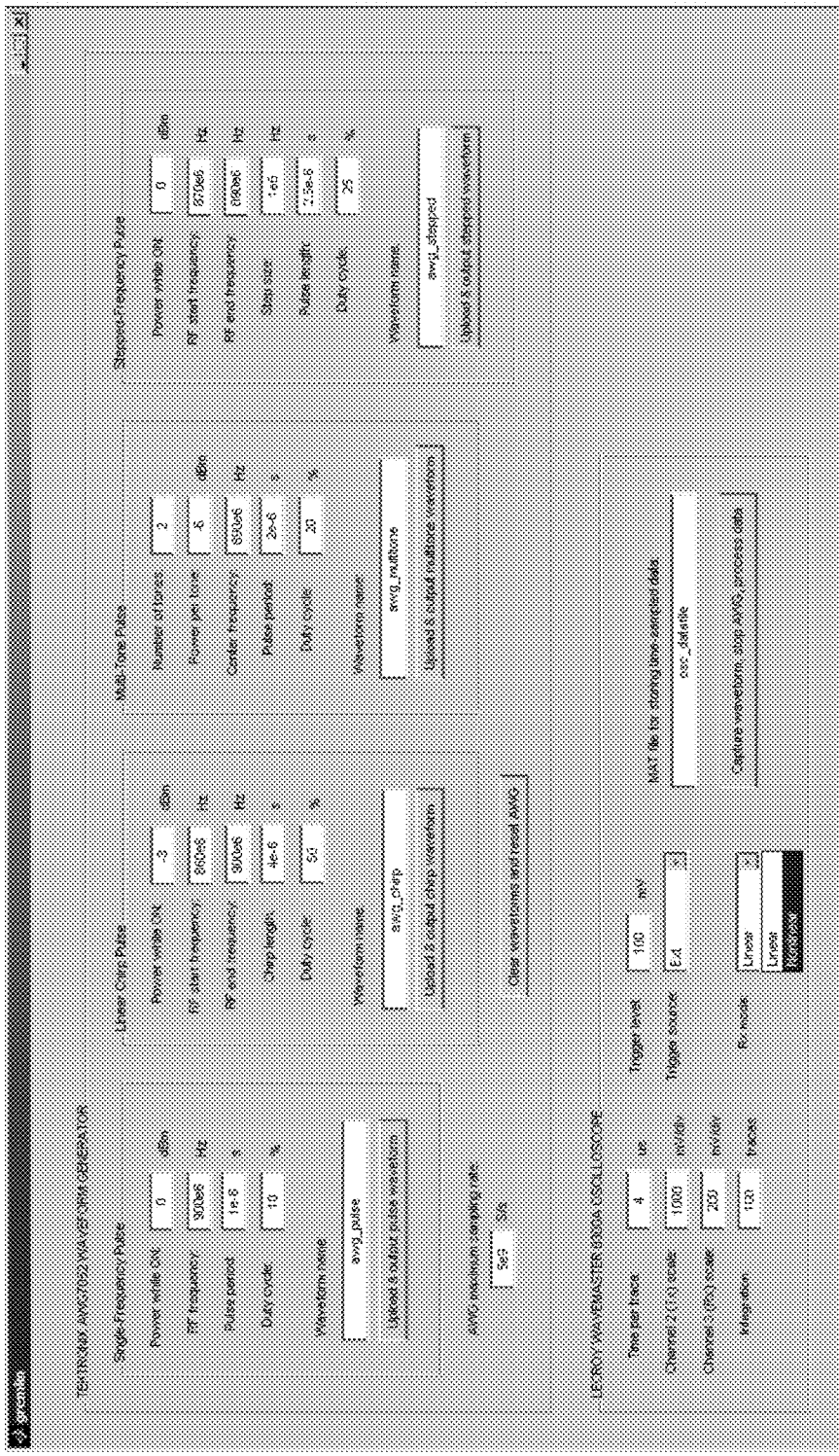
FIG. 14  Graphical user interface for experimental combined-radar system.

Radar data, chirp Tx waveform, linear Rx mode, open-circuit target: $f_{start} = 880$ MHz, $f_{end} = 920$ MHz, $P_{env} = 0$ dBm, $T_{env} = 1$ μs, $D_c = 10\%$, Radar data, chirp Tx waveform, linear Rx mode, open-circuit target: $f_{start} = 880$ MHz, $f_{end} = 920$ MHz, $P_{env} = 0$ dBm, $T_{env} = 1$ µs, $D_c = 10\%$, Radar data, chirp Tx waveform, linear Rx mode: $f_{start}$ = 860 MHz, $f_{end}$ = 940 MHz, $P_{env}$ = 0 dBm, $T_{env}$ = 1 µs, $D_c$ = 10%.

Radar data, RF pulse Tx waveform, linear Rx mode, FRS radio target: $f_{pulse} = 900$ MHz, $P_{env} = 0$ dBm, $T_{env} = 1$ μs, $D_c = 10\%$, FIG. 18 Tx and Rx frequency content, stepped-frequency Tx waveform, nonlinear Rx mode, FRS radio target: $f_{start} = 890$ MHz, $f_{end} = 910$ MHz, $\Delta f = 1$ MHz, $P_{env} = 0$ dBm, $T_{env} = 2$ μs, $D_c = 20\%$, (a) raw data, complete time scale, (b) raw data, zoomed-in time scale.

Radar data, linear chirp Tx waveform, nonlinear Rx mode, FRS radio target:

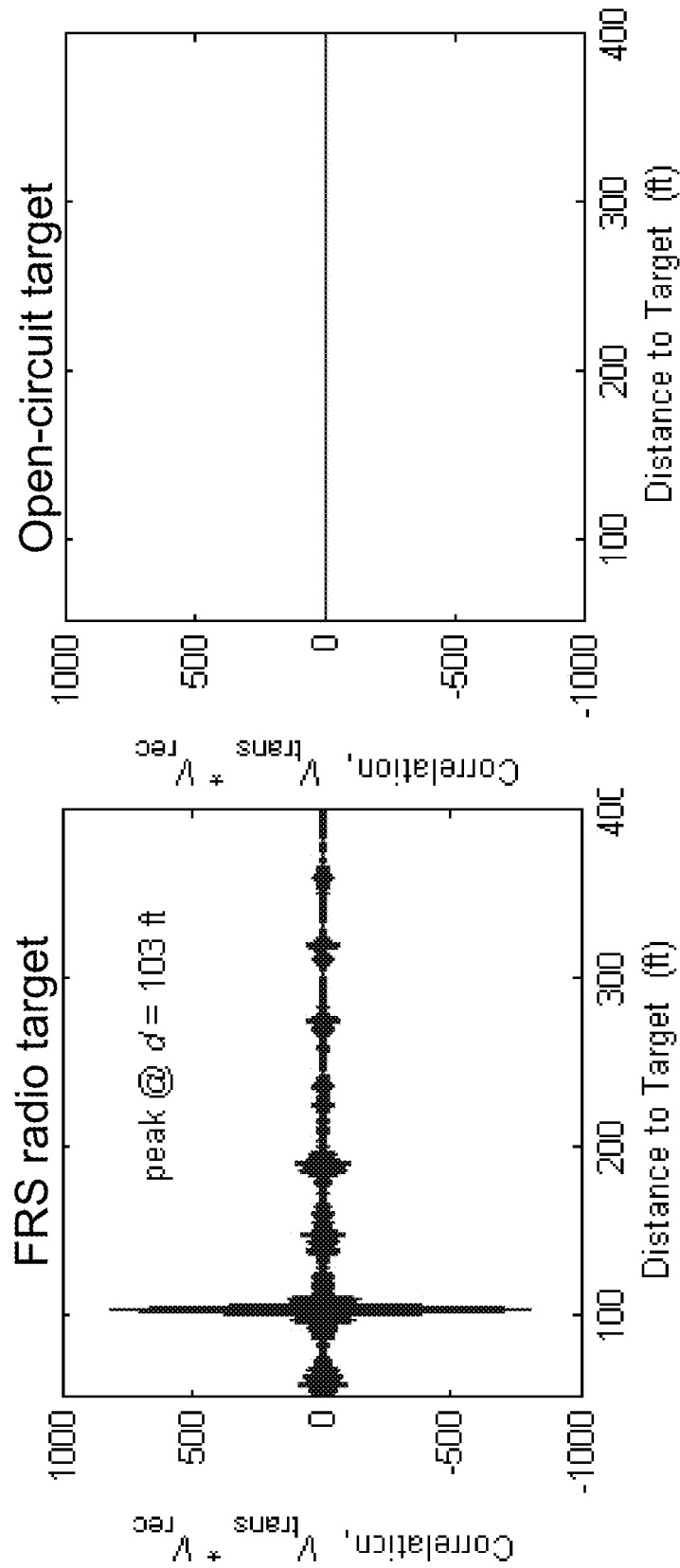
FIG.20  Radar data, chirp Tx waveform, nonlinear Rx mode:

COMBINED RADAR ASSEMBLY WITH LINEAR AND NONLINEAR RADAR

STATEMENT OF GOVERNMENT INTEREST

The invention described herein may be manufactured, used, and licensed by or for the United States Government without the payment of royalties.

REFERENCE TO COMPUTER PROGRAM LISTING APPENDIX

A computer program listing appendix has been submitted via EFS-Web labeled as "codeappendix" containing Appendices A through K. The material contained in the Appendices A through K is incorporated by reference herein as though rewritten fully herein.

BACKGROUND OF THE INVENTION

In the current state of operations, occasions arise such that threats (or targets) must be detected at a standoff distance. Some threats contain components whose permittivity contrasts substantially with that of the emplacement; such is the case with many threats that are buried. The reception of a subsurface linear radar response from an area whose surface is otherwise undisturbed indicates the presence of a threat. Others threats contain metal contacts and semiconductor junctions whose nonlinear electromagnetic response contrasts with that of the emplacement; such is the case with radio frequency (RF) electronics. The reception of a nonlinear radar response from an area that does not otherwise contain electronics indicates the presence of another class of threat. Often, threats contain dielectric, as well as electronic components, hence they will respond to both linear and nonlinear excitation and either linear or nonlinear radar with detect such as threat. Hence, there exists a need to detect both types of threats, whether or not they are collocated using a single assembly or unit.

SUMMARY OF THE INVENTION

A preferred embodiment comprises a combined radar assembly with linear and nonlinear modes. Either mode (linear/nonlinear) may detect a threat or target. By switching between two radar modes, additional information about the threat is received, and, thus, the probability that it is detected is improved.

A preferred embodiment radar assembly for linear and nonlinear radar transmission and reception comprises at least one signal generator; at least one filter operatively connected to the signal generator; a transmitter operatively connected to the at least one filter for transmitting radar signals, and a receiver operative to receive signals comprising the linear and nonlinear responses from the reflected transmitted signals. The receiver further comprises a first channel for processing the linear response from the received signal; a second channel for the processing the nonlinear response from the received signal; and at least one switch operative to select one of the first or second channels through at least one switch. At least one high pass filter is operatively connected to the second channel to attenuate the linear response and at least one first amplifier is operatively connected to the at least one high pass filter to amplify the nonlinear response. The receiver further comprises at least one analog-to-digital converter for converting the analog received signal to a digitized data stream, and at least one display operatively connected to both the first and second channels for displaying both the linear and nonlinear responses.

Optionally, the assembly may comprise two signal generators connected to a signal combiner. Optionally, the signal generated by the at least one signal generator is a single-tone pulse, a modulated chirp pulse having a carrier frequency that begins at a first frequency and increases linearly over a predetermined time interval, or a stepped-frequency chirp pulse.

An alternate preferred embodiment radar assembly for linear and nonlinear radar transmission and reception comprises a signal generator, at least one first filter operatively connected to the signal generator, at least one first amplifier operatively connected to the at least one filter, a transmitter operatively connected to the at least one filter for transmitting radar signals, and a receiver operative to receiving the received signals comprising the linear and nonlinear responses from the reflected transmitted signals. The receiver comprises a first channel for processing the linear response from the received signal, a second channel for the processing the nonlinear response from the received signal, at least one switch operative to select one of the first or second channels through at least one switch, at least one high pass filter operatively connected to the second channel to attenuate the linear response, at least one second amplifier to amplify the nonlinear response; and at least one display operatively connected to both the first and second channels for displaying both the linear and nonlinear responses.

Optionally, the at least one first filter, the at least one first amplifier and the at least one transmitter may operate to process both linear and nonlinear radar signals. The signal generator may generate both linear and nonlinear radar waveforms. The single generator may generate a single-tone pulse, a linear frequency-modulated chirp pulse, or a stepped-frequency chirp pulse.

An alternate preferred embodiment radar assembly for linear and nonlinear radar transmission and reception comprises a base; a transmitter for transmitting linear and nonlinear radar signals operatively associated with the base; a receiver operative to receive signals comprising linear and nonlinear responses from the reflected transmitted signals, the receiver being operatively associated with the base; the transmitter operating to transmit linear radar signals in a first mode and nonlinear radar signals in a second mode, and the receiver operating to receive linear responses from the reflected transmitted signals in the first mode and nonlinear responses from the from the reflected transmitted signals in the second mode; at least one antenna operatively associated with the receiver and the transmitter; and at least one switch operatively associated with the receiver for selecting between the first and second modes.

Optionally the receiver and transmitter may be mounted on the base. Optionally, the transmitter may comprise a linear radar transmitter portion and a nonlinear radar transmitter portion and the at least one antenna may be alternately connected to the linear and nonlinear radar transmitter portions by the at least one switch. Optionally, the receiver may comprise a linear radar receiver portion and a nonlinear radar receiver portion and the at least one antenna is alternately connected to the linear and nonlinear radar receiver portions by the at least one switch.

BRIEF DESCRIPTION OF THE DRAWINGS

The foregoing and other objects, features, and advantages of the invention will be apparent from the following more detailed description of the preferred embodiments of the invention, as illustrated in the accompanying drawings, wherein:

FIG. 1 is a diagrammatic illustration of a target illuminated by a radar wave showing diagrammatically the incident and reflected radar waves for propagation normal to target.

FIG. 5A is a schematic illustration of a nonlinear buried target scene containing a target and two (linear) clutter objects.

FIG. 7 is an illustration of a Single-tone RF pulse output by an arbitrary waveform generator wherein $f_{pulse}$=900 MHz, $P_{env}$=0 dBm, $T_{env}$=1 µs, Dc=10%.

FIG. 8 is an illustration of a Multitone RF pulse output by an arbitrary waveform generator wherein N=2 tones, fc=890 MHz, Ptone=−6 dBm per tone, Tenv=2 µs, Dc=20%.

FIG. 9 is an illustration of a Linear FM chirp pulse output by an arbitrary waveform generator wherein $f_{start}$=860 MHz, $f_{end}$=900 MHz, $P_{env}$=−3 dBm, $T_{env}$=4 µs, $D_c$=50%.

FIG. 10 is an illustration of a Stepped-frequency pulse output by an arbitrary waveform generator wherein $f_{start}$=870 MHz,$f_{end}$=890 MHz, Δf=1 MHz, $P_{env}$=0 dBm, $T_{env}$=2.5 µs, $D_c$=25%.

FIG. 14 is an illustration of a graphical user interface to the alternate preferred embodiment radar system.

FIG. 15A illustrates a plot of radar data, chirp Tx waveform, linear Rx mode, open-circuit target: fstart=880 MHz, fend=920 MHz, Penv=0 dBm, $T_{env}$=1 µs (time interval during which the frequency steps from $f_{start}$ to $f_{end}$), Dc=10% (the duty cycle of the waveform).

FIG. 16A illustrates a plot of radar data, RF pulse Tx waveform, linear Rx mode, FRS radio target: fpulse=900 MHz, Penv=0 dBm, Tenv=1 µs (time interval during which the frequency steps from $f_{start}$ to $f_{end}$), Dc=10% (the duty cycle of the waveform).

FIG. 18 illustrates a plot of Tx and Rx frequency content, stepped-frequency Tx waveform, nonlinear Rx mode, FRS radio target: fstart=890 MHz, fend=910 MHz, Δf=1 MHz, Penv=0 dBm, Tenv=2 µs, Dc=20%.

FIG. 19 (left) plots the raw Tx and Rx data. FIG. 19 (right) plots the cross correlation of the Tx and Rx signal. FIG. 19 illustrates a plot of radar data, linear chirp Tx waveform, nonlinear Rx mode, FRS radio target: fstart=880 MHz, fend=920 MHz, Penv=0 dBm, Tenv=1 µs, Dc=10%.

FIG. 20 illustrates results using a chirp Tx waveform using nonlinear Rx chain against a purely linear target in order to demonstrate that the transceiver does not indicate detection if the target is linear and the radar is listening for a nonlinear response. FIG. 20 illustrates a plot of radar data, chirp Tx waveform, nonlinear Rx mode: fstart=890 MHz, fend=910 MHz, Penv=0 dBm, Tenv=1 is (time interval during which the frequency steps from $f_{start}$ to $f_{end}$), Dc=10% (the duty cycle of the waveform). The left side of FIG. 20 illustrates results from a FRS radio target and the right side is the result from an open circuit (a linear but highly reflective target).

Figures 2A, 2B:
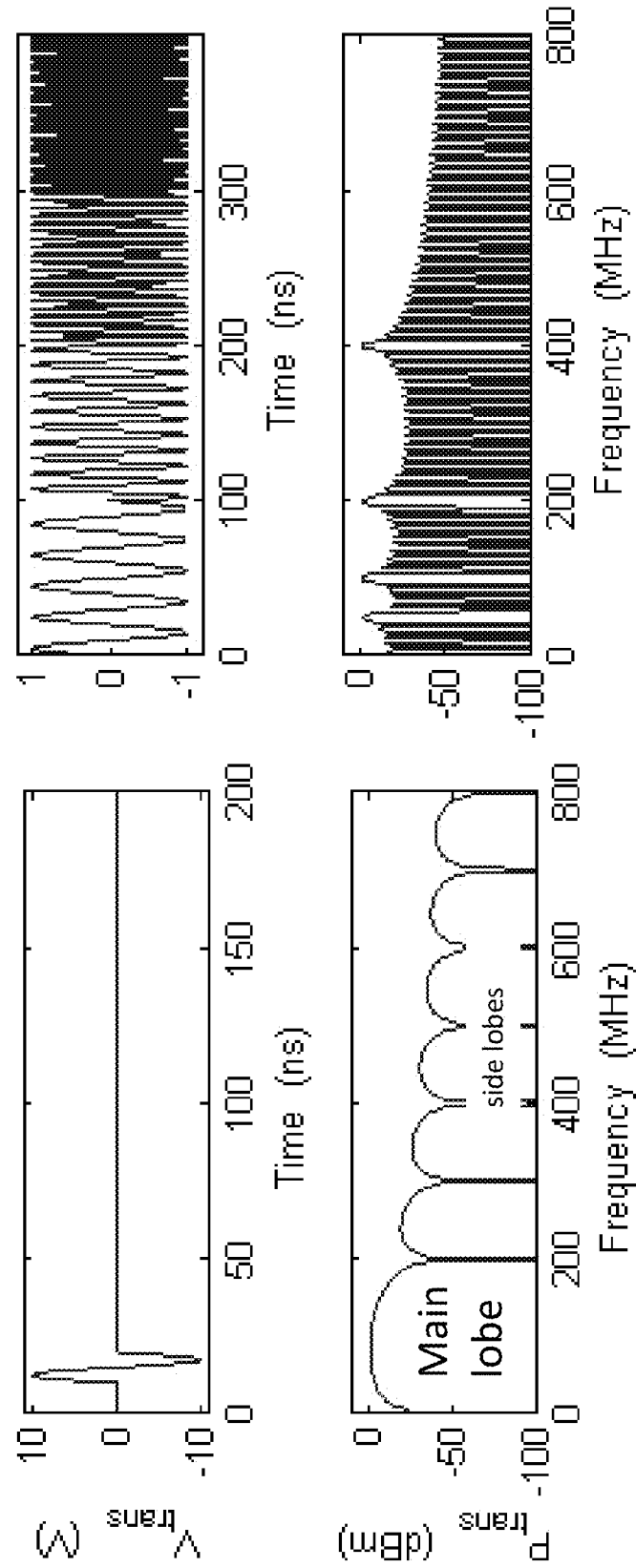
FIG. 2A is an illustration of a single-cycle impulse linear radar waveform and its spectrum.
FIG. 2B is an illustration of a stepped-frequency waveform, which is an alternative linear waveform design that allows for more flexibility in the transmitted band.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, channels and/or sections, these elements, channels and/or sections should not be limited by these terms. For example, when referring first and channels or sections, these terms are only used to distinguish one element, channel section from another region, layer or section. Thus, a first element, channel or section discussed below could be termed a second element, channel or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

A preferred embodiment of the present invention comprises a combination of linear and nonlinear radar that detects a set of targets greater than either radar can detect alone.

Linear and Nonlinear Radar Comparision

Linear radar is well-suited to the detection of a target whose complex permittivity $\hat{\in}$ contrasts greatly with that of its surroundings:

$$\hat{\in} = \in' - j \cdot \in'' \tag{1}$$

where $\in'$ is the "real" part and $\in''$ is the "imaginary" part of the permittivity. The permittivity of a material relative to that of free space is its dielectric constant $\hat{\in}_r$:

$$\hat{\varepsilon}_r = \frac{\hat{\varepsilon}}{\varepsilon_0} = \frac{\varepsilon'}{\varepsilon_0} - j\frac{\varepsilon''}{\varepsilon_0} = \varepsilon'_r - j \cdot \varepsilon''_r. \tag{2}$$

$$\varepsilon_0 = 8.854 \cdot 10^{-12} \frac{F}{m} \quad \varepsilon_r = |\hat{\varepsilon}_r| \tag{3}$$

FIG. 1 is a diagrammatic illustration of a target illuminated by a radar wave showing diagrammatically the incident and reflected radar waves for propagation normal to target. The electric field of the incident wave $E_{in}$ is represented by a single-tone sinusoid of frequency $f_0$ and amplitude $E_0$:

$$E_{in}(t) = E_0 \cos(2\pi \cdot f_0 \cdot t). \tag{4}$$

Assuming normal incidence (i.e. the direction of propagation of the wave is normal to the boundary of the target), the reflected wave is:

$$E_{refl}(t) = |E_1|\cos(2\pi \cdot f_0 \cdot t + \phi\{E_1\}) \tag{5}$$

$$E_1 = \Gamma \cdot E_0 \quad \Gamma = \frac{\sqrt{\varepsilon_{r1}} - \sqrt{\varepsilon_{r2}}}{\sqrt{\varepsilon_{r1}} + \sqrt{\varepsilon_{r2}}} = \frac{1 - \sqrt{\varepsilon_r}}{1 + \sqrt{\varepsilon_r}} \tag{6}$$

The frequency of the reflected wave is the same as that of the incident wave, but its amplitude is scaled by the reflection coefficient $\Gamma$. For $\in_r=1$, $\Gamma=0$; the target is transparent to the radar wave traveling in air and there is no reflection.

As the contrast in $\in_r$ between a target and that of the medium through which the radar wave is propagating increases, the strength of the radar reflection from that target increases. The value of $\in''_r$ for a typical conductor (e.g. aluminum) is greater than $10^7$ S/m. Thus, conductive targets are very detectable, even if they are buried or obscured by insulators. For insulators, $\in''_r$ is near zero but $\in'_r$ can take on a wide range of values, from $\in'_r \approx 1$ for dry foam up to $\in'_r = 80$ for distilled water. Thus, insulating targets are not as detectable, as their radar reflections depend much more strongly on $\in'_r$.

Nonlinear radar exploits a completely different phenomenon: it relies on the nonlinear electromagnetic properties of a target to convert a portion of the incident radar wave into a reflected wave at a different frequency. Most materials found in nature are electromagnetically linear (with the exception of ferromagnetics), while many man-made materials are electromagnetically nonlinear. Semiconductor devices, such as radios and cell phones, are highly nonlinear.

A simple model for radio-frequency (RF) electromagnetic nonlinearity is the memoryless power series given by:

$$E_{refl}(t) = a_1 E_{in}(t) + a_2 E_{in}^2(t) + a_3 E_{in}^3(t) + \ldots = \sum_{n=1}^{N} a_n E_{in}^n(t) \quad (7)$$

where $a_n$ are complex power-series coefficients, and $E_{refl}$ is the electric field reflected by the target. The value of $a_1$ is the linear response of the target, $\Gamma$; the values $\{a_2, a_3, \ldots\}$ depend upon the nonlinear properties of the target. If a nonlinear target is illuminated by the radar wave given by equation (4), the reflected wave is $$E_{refl}(t) = \sum_{M=1}^{\infty} |E_M| \cos(2\pi \cdot M \cdot f_0 \cdot t + \phi\{E_M\}) \quad (8)$$

$$E_M = \sum_{k=1}^{\infty} \binom{2k+M-2}{k-1} \frac{a_{2k+M-2}}{2^{2k+M-3}} E_0^{2k+M-2} \quad (9)$$

which is a sum of sinusoids at harmonics M of $f_0$, each with amplitude $|E_M|$ and phase $\phi\{E_M\}$. If the radar measures $E_M=0$ for all M>1, then no nonlinear target is detected. If the radar measures $E_M$ for some M>1, however, a nonlinear target is detected.

A preferred embodiment combined radar detects targets using linear as well as nonlinear reflective responses. The linear radar detects targets whose permittivity contrasts with that of the background, while the nonlinear radar detects targets whose electromagnetic properties produce a change in frequency between the incident and reflected waves.

Implementation

Linear radar can be implemented in different ways, commonly designated by the transmit waveform, such as continuous-wave (CW), pulsed single-tone, or chirp. To achieve an ultra-wide bandwidth for ground penetration as well as imaging resolution, the Army Research Laboratory (ARL) designed the Synchronous Impulse Reconstruction (SIRE) radar as described in F. Koenig, M. Ressler, G. Smith, L. Nguyen, and R. Harris, "Synchronous Impulse Reconstruction (SIRE) radar sensor," U.S. Army Research Laboratory, Adelphi, Md., Technical Report ARL-TR-4661, November 2008, herein incorporated by reference. The SIRE radar uses a single-cycle impulse waveform, two transmit antennas, 16 receive antennas, and multiple data traces collected while the radar platform is in motion in order to form high-resolution images of surface and shallow-buried targets. FIGS. 2A and 2B are linear radar waveforms for impulse and stepped frequency, respectively. A single-cycle impulse and its spectrum are illustrated in FIG. 2A. An alternative design that allows for more flexibility in the transmitted band is the stepped-frequency waveform illustrated in FIG. 2B. Both impulse and stepped-frequency waveforms are broadband. For the impulse, the peak power is high but the average power is low. For the continuous stepped-frequency signal, the peak power and the average power are the same. Either waveform will provide linear detection and ranging.

One advantage of a stepped-frequency design, however, is that its underlying switched-frequency signal source is likely able to dwell on a single frequency for a long period of time. As dwell time increases while transmitting the same average power in a tone or a series of tones, the side lobes caused by interrupting the transmission (e.g. turning the source off or switching to another tone) diminish. This extended dwell time is necessary in order to minimize reflected linear side-lobes from nonlinear reflections, which are usually very weak.

Figures 3A, 3B:
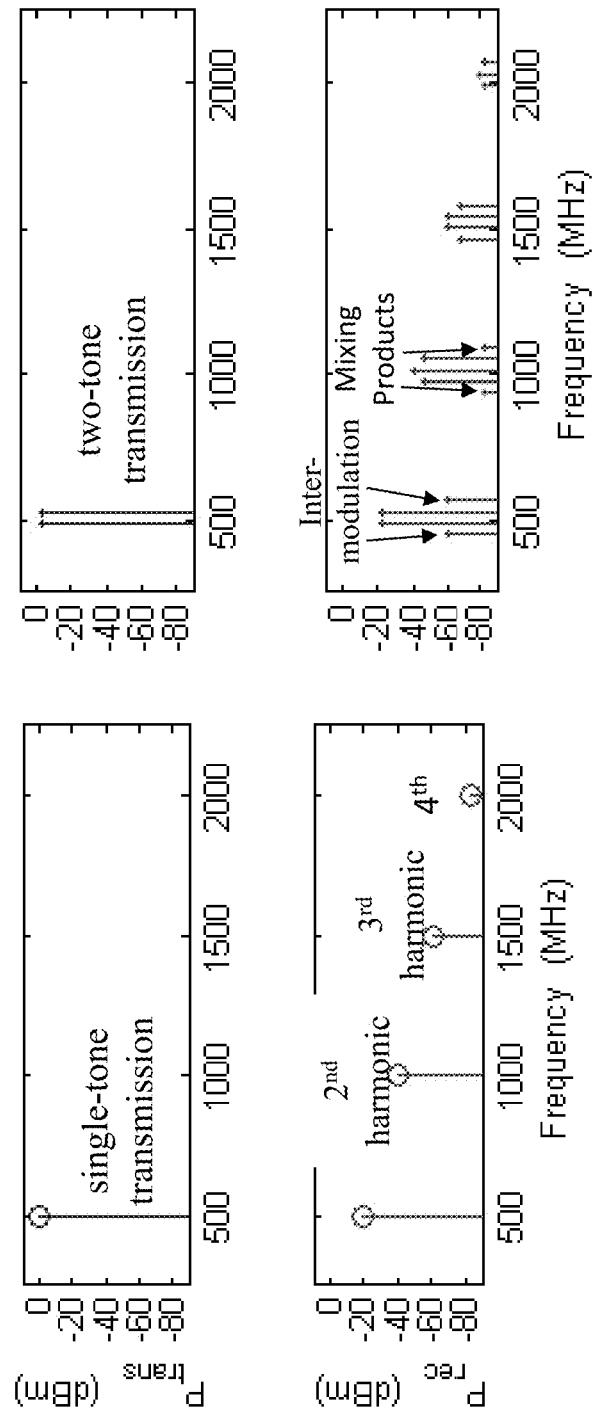
FIG. 3A is an illustration of an example of a single-tone nonlinear radar waveform showing the transmission of one tone and reception of harmonics of that tone.
FIG. 3B is an illustration of an example of a two-tone nonlinear radar waveform showing the transmission of two-tones and reception of harmonics well as mixing products near those harmonics

Nonlinear radar can also be implemented in different ways. One popular technique is to transmit a single frequency $f_0$ and receive the target response at the second harmonic of the transmitted tone, $2f_0$, as described in U.S. patent application Ser. No. 13/870,519 to Dr. Gregory J. Mazzaro, et al. entitled "Multizone Harmonic Radar and Method of Use," herein incorporated by reference. A slight variation of this technique tracks a Doppler shift at $2f_0$ for moving targets. See for example, A. Singh and V. Lubecke, "Respiratory monitoring and clutter rejection using a CW Doppler radar with passive RF tags," *IEEE Sensors*, vol. 12, no. 3, pp. 558-565, March 2012, herein incorporated by reference. Other variations chirp (see for example, C. Stagner, A. Conrad, C. Osterwise, D. G. Beetner, and S. Grant, "A practical superheterodyne-receiver detector using stimulated emissions," *IEEE Trans. Instrum. Meas.*, vol. 60, no. 4, pp. 1461-1468, April 2011) or digitally-modulate (see for example, V. Polacek and R. Pavlik, "The use of digital modulation signals in radar system for detection of nonlinear scatterers," in *Proc. Int. Radar Symp., IRS*, pp. 743-747, September 2011) the transmit waveform for greater noise rejection. Another common technique is to transmit two tones $f_1$ and $f_2$ and receive the intermodulation tones $2f_1-f_2$ and $2f_2-f_1$ (see for example A. F. Martone and E. J. Delp, "Characterization of RF devices using two-tone probe signals," in *Proc. 14th Workshop on Stat. Sig. Process., IEEE/SP*, pp. 161-165, August 2007). A technique recently developed at ARL transmits at least two tones and receives not only a harmonic of the transmitted tones (e.g. $2f_1$ and $2f_2$) but also the mixing products of those tones near that harmonic (e.g. $3f_1-f_2, f_1+f_2, 3f_2-f_1$ as described in U.S. patent application Ser. No. 13/870,519 to Dr. Gregory J. Mazzaro, et al. entitled "Multitone Harmonic Radar and Method of Use," herein incorporated by reference. FIG. 3A illustrates examples of transmit and receive spectra for a nonlinear radar that transmits one tone and receives harmonics of that tone. FIG. 3B shows examples of spectra for a radar that transmits two tones and receives harmonics as well as mixing products near those harmonics.

A common architecture for transmitting and receiving waveforms for both linear and nonlinear radar is necessary in order to minimize the size, weight, and power of the combined radar system. One preferred embodiment combines a wideband stepped-frequency approach with a narrowband two-tone nonlinear approach is given in FIG. 4.

The signal sources are two stepped-frequency waveform generators 11A, 11B. As an alternative, the generators 11A, 11B may be pulsed. For linear transmission, a single source 11B is amplified by amplifier 12, mixed by mixer 13, amplified by amplifier 14, and applied to the transmit antennas at terminal 15. Mixer 13 is an upconverting mixer for the transmitter. Its function is to change the frequency of the original baseband (low frequency) signal to an appropriate radio-frequency (high frequency) signal for transmission and excitation of the nonlinear response from a target.

For nonlinear transmission, the outputs of the two sources 11A, 11B are combined), filtered by filters 17, 19 and amplified by amplifiers 16, 18, and applied via terminal 21 and switch 22 to the transmit antennas 23. Note that the switch 22 alternates between contact with terminal 21 (to transmit nonlinear radar) to terminal 15 (to transmit linear radar).

At the receiving end, for linear reception, the signal is received by receiver antennas 24 and switch 25 selects the output of one of the receiver antennas 24, and passes the signal to the base of switch 26. Switch 26 alternates between terminals 27 and 28. For linear reception, the signal is amplified by amplifier 29 and lowpass filtered by low pass filter 30, and downconverted by mixer 31, filtered at filter 32 and inputted to an analog-to-digital converter 33. Mixers 31 and 36 are downconverting mixer. Their function is to change the incoming radio-frequency signal to a baseband signal suitable for digitization (and ultimate decision as to the presence of a target). For nonlinear reception, the signal is highpass filtered by filter 34, amplified by amplifier 35, downconverted by mixer 36, and filtered by bandpass filters 37, 39 (with an amplifier 38 therebetween). Separate analog-to-digital converter (ADC) units 33, 40 are used for linear and nonlinear signal capture. The ADC in the linear chain will likely be wideband at a lower bit-resolution in order to determine precise ranging for linear responses. The ADC 40 in the nonlinear chain will likely be narrowband at a higher bit-resolution in order to maintain a high dynamic range in the receiver to detect weak nonlinear responses. A pair of RF switches 22, 26—switch 22 in the transmitter and switch 26 in the receiver, switched in tandem—adjust the mode-of-operation of the radar between linear and nonlinear. Transmitting from more than one antenna 23 (e.g. the two depicted in FIG. 4) increases the overall aperture for illuminating targets-of-interest. Receiving from more than one antenna 24 (e.g. the four depicted in FIG. 4) improves signal-to-noise ratio (SNR) and allows for the angle-of-arrival to the target to be determined. Stepping and/or pulsing the transmit waveform (from 11A, 11B) allows the range to the target to be determined.

The preferred embodiment comprises a transceiver comprising a transmit chain that generates waveforms that are appropriate for both linear and nonlinear modes of operation and a switchable receive chain, which captures either linear or nonlinear responses from a radar target. The response to be exploited by the nonlinear receiver may, for example, be the second harmonic of the transmitted waveform.

Target Localization

Figures 5B, 5C:
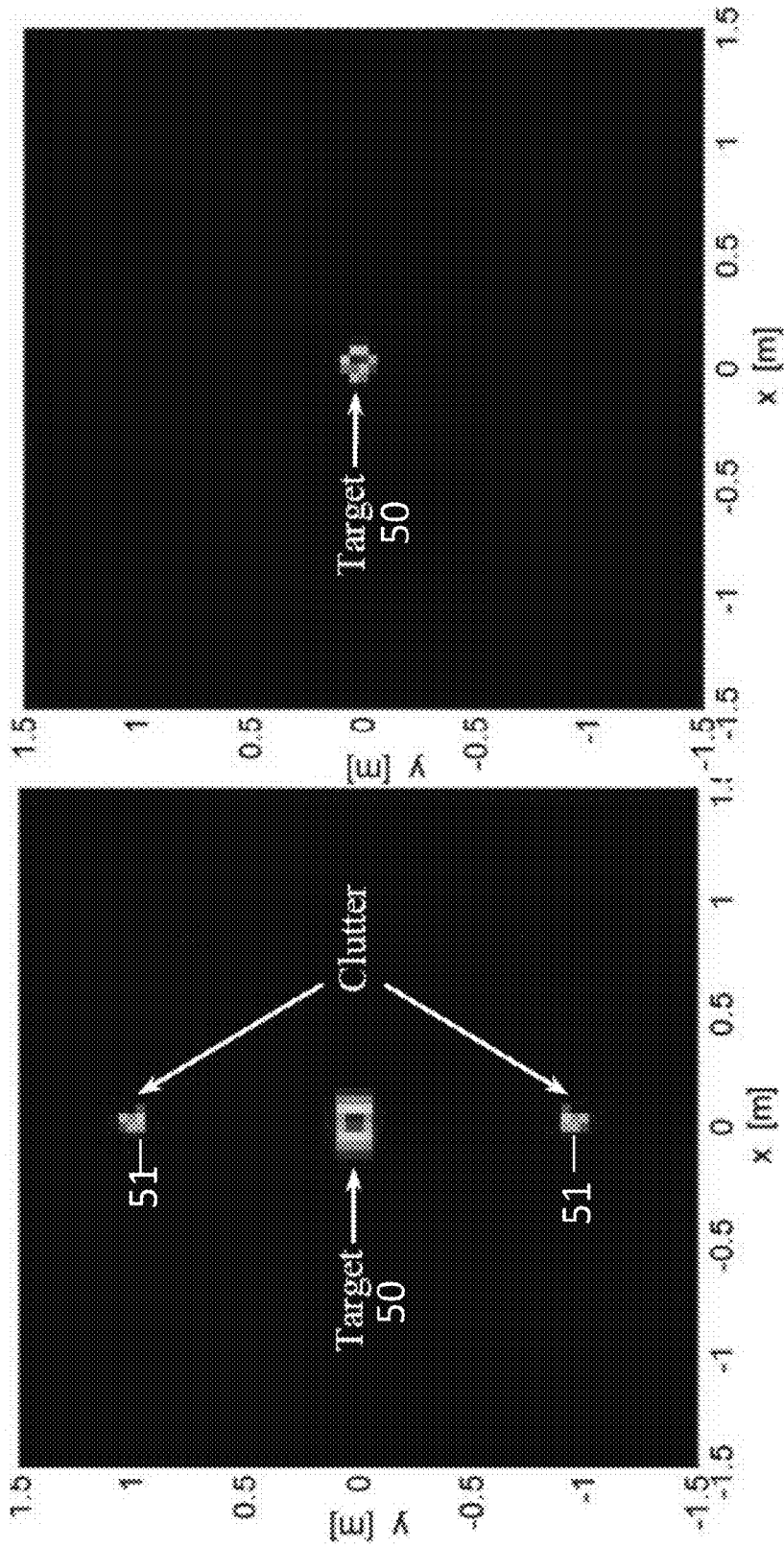
FIG. 5B is an illustration of an image of the target of FIG. 5A generated using harmonic multi-static received signal matrices at $f_0$=840 MHz.
FIG. 5C is an illustration of an image of the target of FIG. 5A generated using harmonic multi-static received signal matrices $2f_0$=1680 MHz.

After the transmit waveform has reflected from the target and been received, an imaging algorithm can be used to process the reflections for localization. A time-reversal-based multiple-signal classification (TR-MUSIC) algorithm is proposed to generate the images using the steady-state harmonic response as described in D. Liao, "A hybrid approach for characterizing linear and nonlinear electromagnetic scattering: Theory and applications," U.S. Army Research Laboratory, Adelphi, Md., Technical Report ARL-TR-6261, November 2012, herein incorporated by reference. For M nonlinear targets and N transmit/receive antennas, the received signal at frequency $f_s$ received at the array due to excitation at frequency $f_i$ by the n-th transmitter is $$s^r_{sn}(f_s,f_i) = \sigma_{s1}(f_s,f_i)G(r^F_{s1},r^F_n,f_i)G^r(r^F_{s1},f_s) + \sigma_{s2}(f_s,f_i)G(r^F_{s2},r^F_n,f_i)G^r(r^F_{s2},f_s) + \ldots \sigma_{sM}(f_s,f_i)G(r^F_{sM},r^F_n,f_i)G^F(r^F_{sM},f_s) \quad (10)$$

where $r^F_n$ (n=1, 2, . . . N) is the location of the n-th array element, $r^F_{sm}$ (m=1, 2, . . . M) is the location of the m-th target, $\sigma_{sm}(f_s,f_i)$ is the scattering coefficient of the m-th target, and $G(r^F,r^F,f)$ is the Green's function of the radar environment. From equation (10) the signal subspace is spanned by the Green's function vectors $G^r(r^F_{s1},f_s)$, $r^F_{s2},f_s)$, . . . , $G^r(r^F_{sM},f_s)$ i.e. the target locations are encoded within the subspace representation of the received signal. After invoking reciprocity, the frequency-domain N×N multi-static matrix for the antenna array can be written $$K(f_s, f_i) = \sum_{m=1}^{M} \sigma_{sm}(f_s, f_i) \vec{G}(\vec{r}^F_{sm}, f_s) \vec{G}^T(\vec{r}^F_{sm}, f_i) \quad (11)$$

in which $^T$ represents the transpose operation, and the matrix element $K_{pq}(f_s,f_i)$ is the response at the p-th array element due to excitation at the q-th array element. In practice, $K(f_s,f_i)$ is simply the measurement matrix. For image generation, the signal subspace of $K(f_s,f_i)$ is computed using singular value decomposition:

$$K(f_s,f_i) = U(f_s,f_i)\Lambda(f_s,f_i)V(f_s,f_i)^H \quad (12)$$

where $U(f_s,f_i)$ and $V(f_s,f_i)$ are unitary matrices, $\Lambda(f_s,f_i)$ contains the singular values of $K(f_s,f_i)$, and $^H$ denotes the conjugate transpose operation. The column vectors of $U(f_s,f_i)$ supply the singular vectors $u_p(f_s,f_i)$ (p=1, 2, . . . , N). Assuming that the received signal subspace is spanned by the singular vectors corresponding to the first L non-zero singular values and the null subspace is spanned by the remaining singular vectors corresponding to singular values equal to zero, an imaging functional can be constructed:

$$O(\vec{r}, f_s, f_i) = \left( \sum_{p=L+1}^{N} \left| \langle u_p(f_s, f_i), \vec{G}(\vec{r}, f_s) \rangle \right|^2 \right)^{-1} \quad (13)$$

where the Green's function vector $G^r(r^F,f_s)$ can be computed using numerical or analytical methods. The imaging functional in equation (13) peaks at the target locations. This functional is employed for imaging in the scenario displayed in FIG. 5A. The scene consists of a nonlinear-circuit-loaded target 50 buried in the ground, along with two (linear) clutter objects 51. The sensing array is composed of N=16 transceivers distributed over a 2-m-wide aperture with a standoff distance of 6.6 m. Here single-tone CW excitation is assumed (e.g., step-frequency excitation with a single frequency). The harmonic multi-static received signal matrices at $f_0$ (the excitation frequency) and $2f_0$ (the second harmonic) are calculated using a hybrid solver as described within the aforementioned reference by D. Liao. The images at the two frequencies are displayed in FIGS. 5B and 5C. The target 50 is accurately localized for both the $f_0$ and $2f_0$ images. The clutter objects 51 do not appear in the image at $2f_0$.

Figure 6:
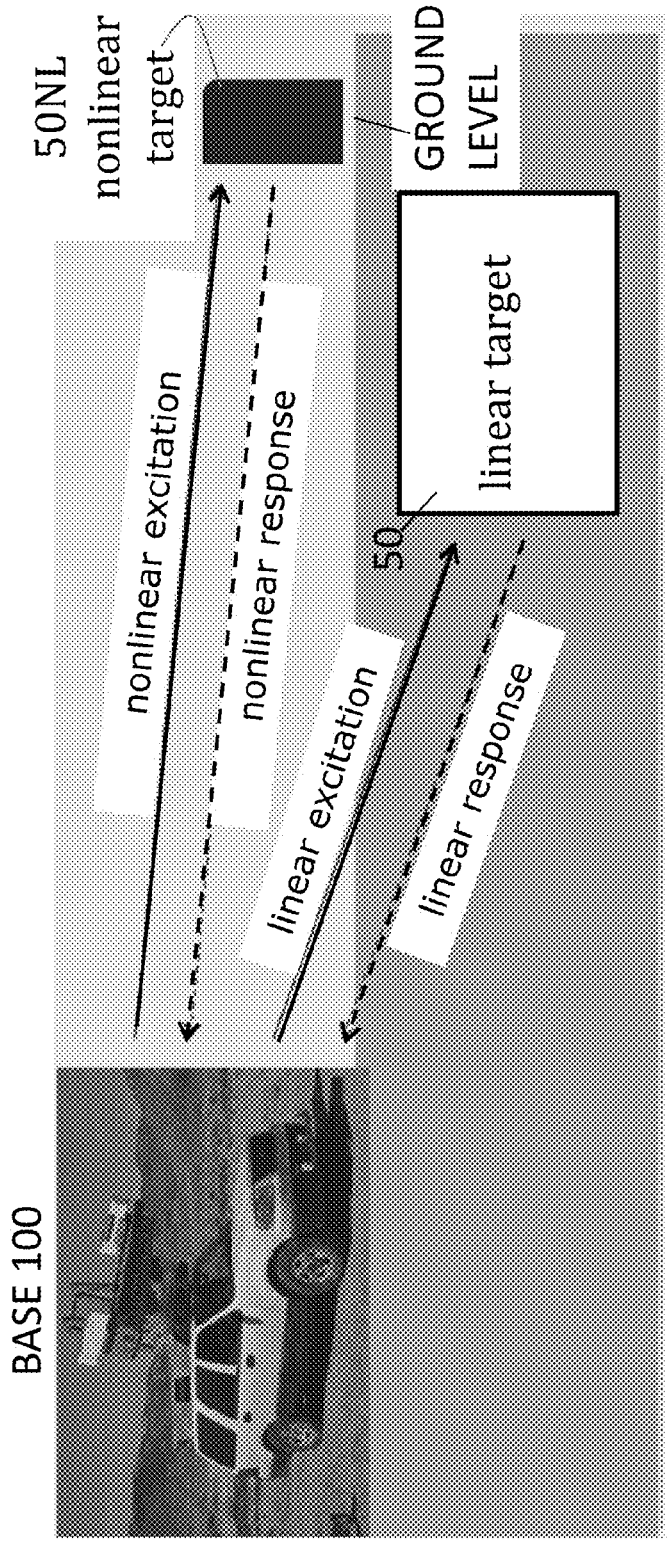
FIG. 6 is a depiction of combined radar for the detection of threats containing both linear (depicted by a picture of the Synchronous Impulse Reconstruction (SIRE) radar) and also depicting nonlinear components.

FIG. 6 is a depiction of combined radar for the detection of threats containing both linear (depicted by a picture of the Synchronous Impulse Reconstruction (SIRE) radar) and also depicting nonlinear components. Shown for example, FIG. 6 shows a base 100, a linear target 50NL below ground and a nonlinear target 50 above ground.

Transmit Waveforms

The four waveforms selected for the linear/nonlinear transmitter are the single-tone pulse, the multitone pulse, the linear frequency-modulated (FM) chirp, and a stepped-frequency pulse.

A mathematical representation for a single-tone pulse produced by an arbitrary waveform generator (AWG) is $$V_{AWG} = A_{env} \cos(2\pi \cdot f_{pulse} \cdot t) s(t) \quad (14)$$

with a carrier frequency $f_{pulse}$. The amplitude $A_{env}$ is computed from the power of the envelope of the pulse $P_{env}$ (in decibels referenced to 1 mW) by:

$$A_{env} = \sqrt{10^{P_{env}^{dbm}/10} \cdot 2(50\Omega)(10^{-3}\text{V/mV})}. \quad (15)$$

Figure 7:
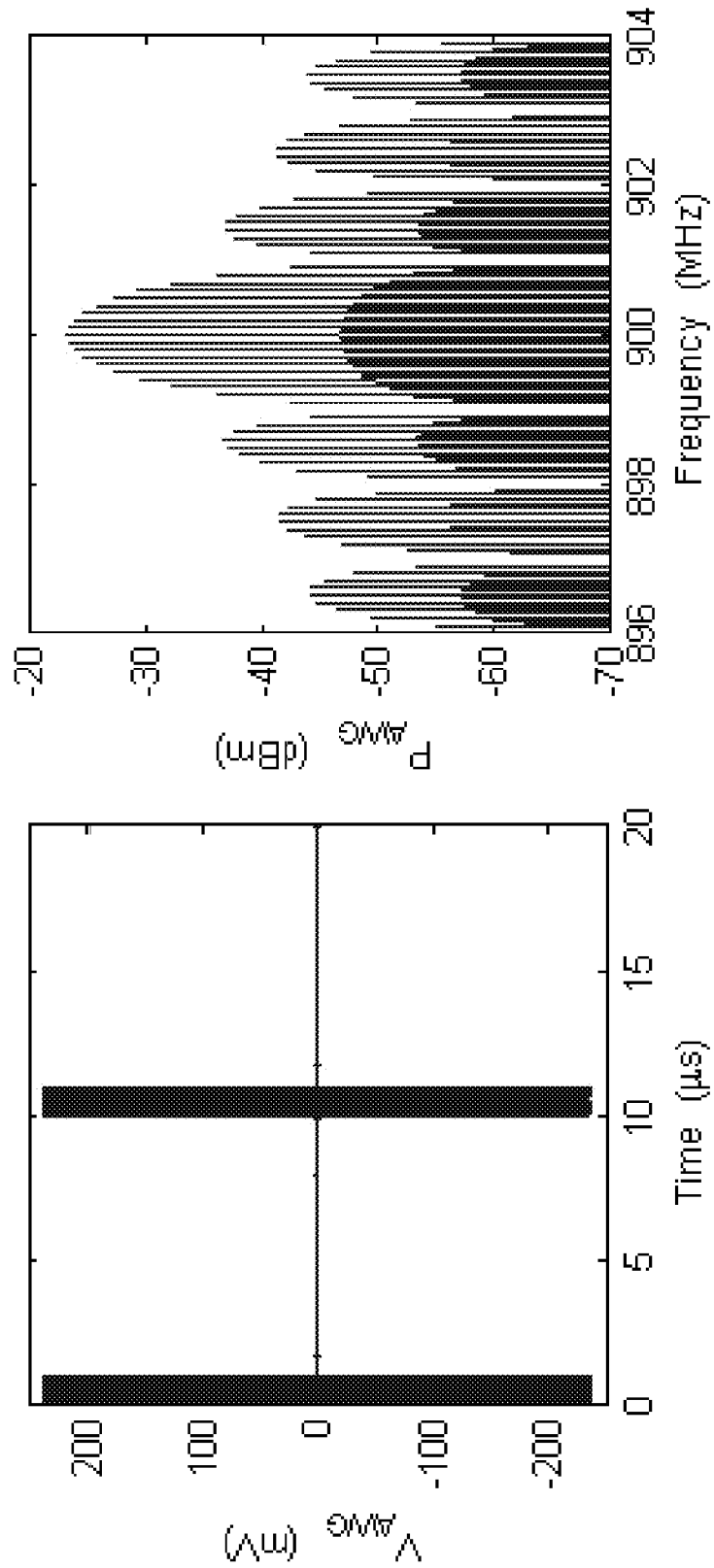
FIGS. 7-10 illustrate four waveforms selected for the preferred embodiment linear/nonlinear transmitter: the single-tone pulse, the multi-tone pulse, the linear frequency-modulated (FM) chirp, and the stepped-frequency chirp.

The pulse modulation is given by the switching waveform s(t):

$$s(t) = u(t) - u(t - D_c T) = s(t+T) \quad D_c T = T_{env} \quad (16)$$

which has a period T and a duty cycle $D_c$. The pulse is active during the time interval $T_{env}$. An example of an RF pulse generated by a Tektronix AWG7052 is given in FIG. 7. A Matlab function which generates a single-tone RF pulse is given in Appendix A.

It should be noted that (a) signals presented in the following description were captured in time by a Lecroy Wavemaster 8300A oscilloscope and in frequency by an Agilent N9342C spectrum analyzer; (b) the sampling rate of the 8300A oscilloscope was 20 GS/s, and the resolution bandwidth of the N9342C analyzer was 1 kHz; and (c) the amplitude of each waveform is less than $A_{env}$ computed by equation 15 due to the loss introduced by the 8-ft RG-58 Subminiature Version A (SMA) cable, which feeds each of the signal capture instruments.

Multitone Pulse

If, instead of a single RF carrier frequency, multiple frequencies are active during the pulse, a multitone pulse is generated:

$$V_{AWG} = A_{tone}\{\cos(2\pi f_1 \cdot t) + \cos(2\pi f_2 \cdot t) + \ldots + \cos(2\pi f_N \cdot t)\}s(t) \quad (17)$$

which contains N frequencies given by $f_1, f_2, \ldots f_N$. In this representation, the amplitude of each tone is $A_{tone}$ and each tone begins at a common initial phase (for maximum peak-to-average ratio, which generates a maximum nonlinear response). Also, the tones are centered at $f_c$ and separated by $f_{space}$:

$$\frac{1}{N}\sum_{i=1}^{N} f_i = f_c \quad f_{i+1} - f_i = f_{space} \quad (18)$$

Figure 8:
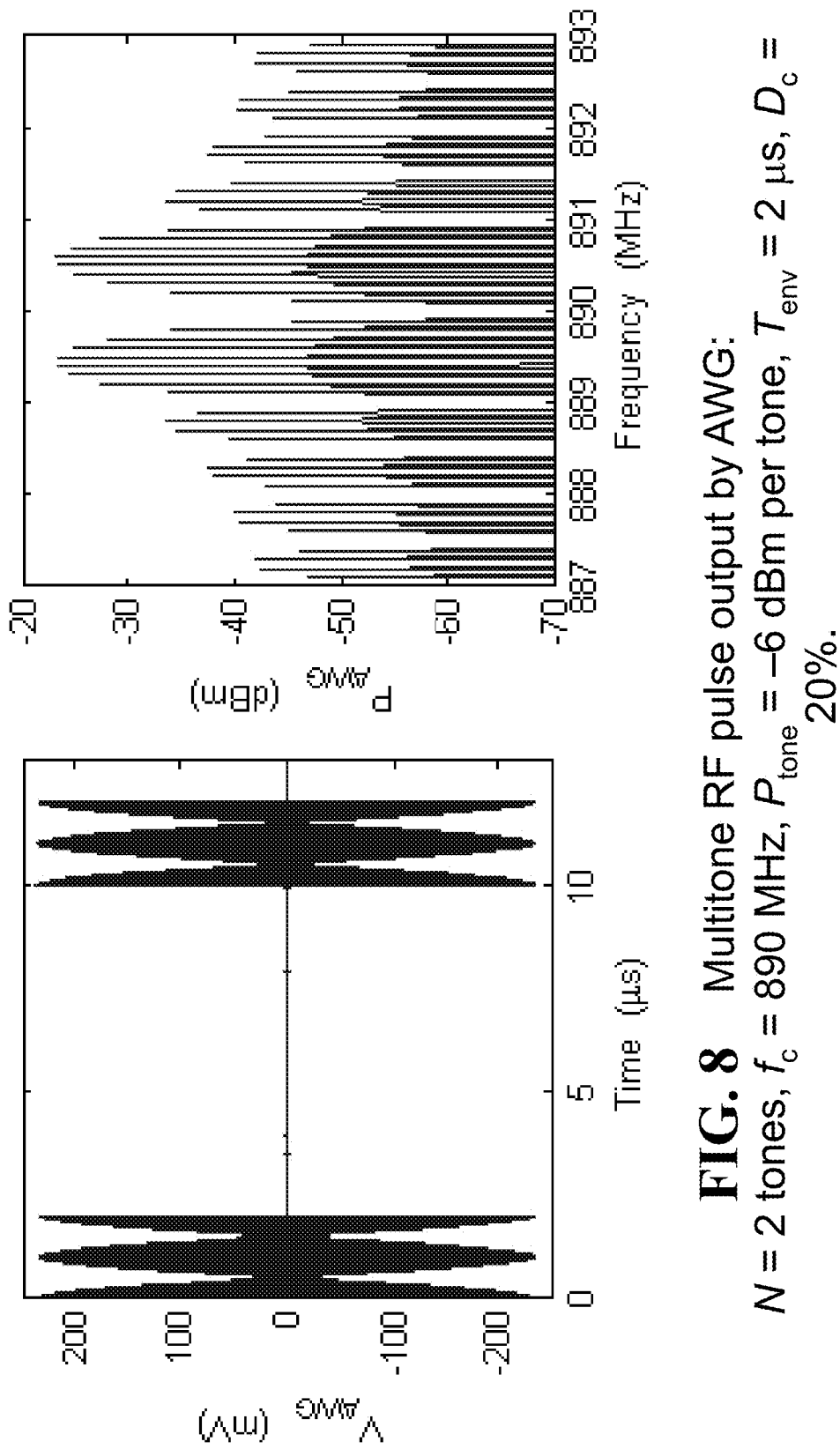

The active tones are again modulated by the on/off pulse waveform s(t). An example of a multitone pulse is shown in FIG. 8. A MATLAB function, which generates this waveform, is given in Appendix B.

Linear Frequency-Modulated Chirp Pulse

Figure 9:
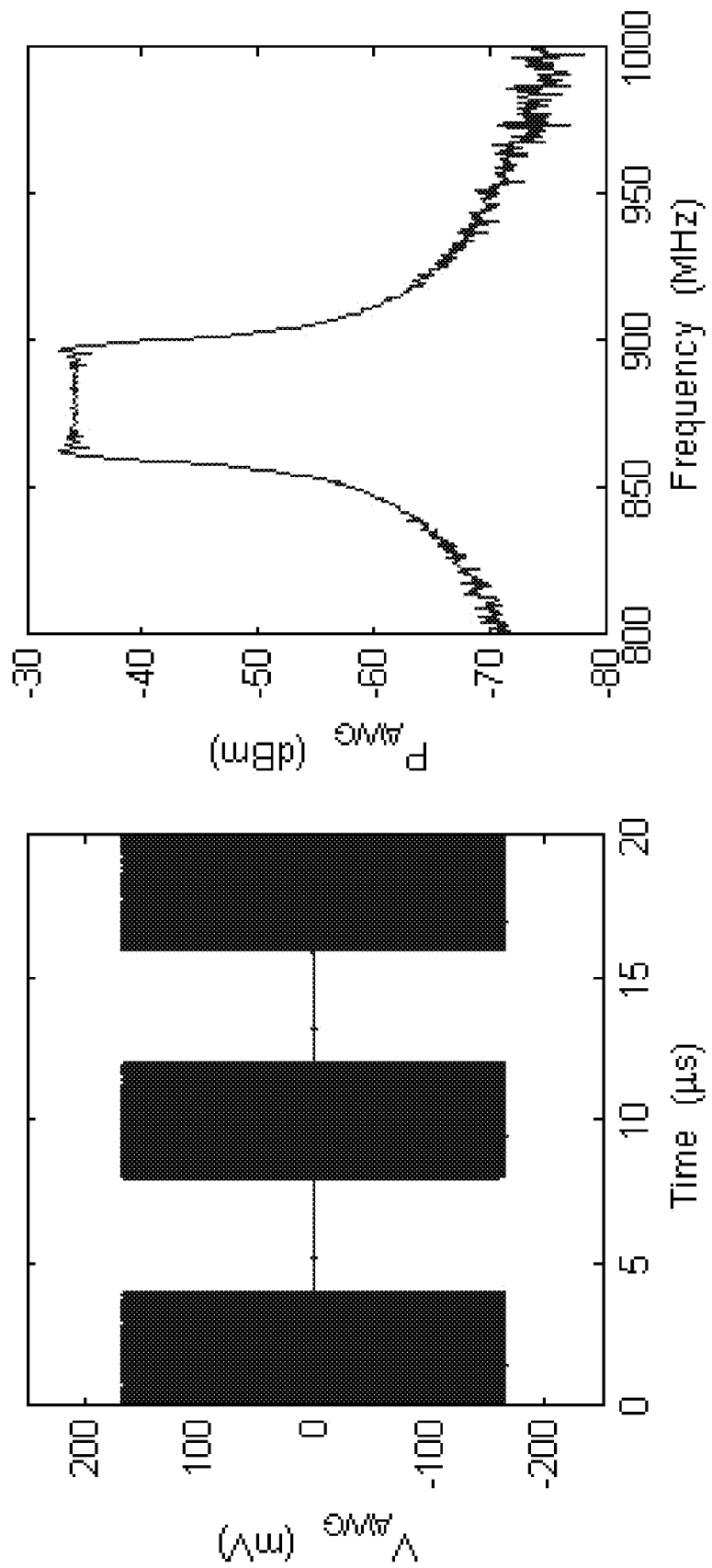

A pulse whose carrier frequency begins at $f_{start}$ and increases linearly to $f_{end}$ over the time interval $T_{env}$ is given by $$V_{AWG} = A_{env} \cos\left[2\pi \cdot (f_{start} + (k/2)t) \cdot t\right]s(t) \quad k = (f_{end} - f_{start})/T_{env} \quad (19)$$

where k is the linear chirp rate and $A_{env}$ is the amplitude of the pulse envelope. An example of a linear FM chirp pulse is shown in FIG. 9. A Matlab function which generates this waveform is given in Appendix C.

Stepped-Frequency Pulse

A chirp whose carrier frequency steps between discrete values can be represented by $$V_{AWG} = A_{env}\cos[2\pi \cdot f(t) \cdot t]s(t) \quad (20)$$

$$f(t) = \begin{cases} f_{start} & 0 \le t < \Delta t \\ f_{start} + \Delta f & \Delta t \le t < 2\Delta t \\ f_{start} + 2\Delta f & 2\Delta t \le t < 3\Delta t \\ \ldots & \ldots \\ f_{start} - \Delta f & T_{env} - \Delta t \le t < T_{env} \end{cases} \quad \Delta t = \frac{T_{env}}{N_{steps}} \quad (21)$$

where $N_{steps}$ is the number of steps, $T_{env}$ is the length of the stepped-frequency chirp, $A_{env}$ is the amplitude of the chirp, $\Delta f$ is the spacing in frequency between each step, and $\Delta t$ is the spacing in time between each step. It should be noted that this representation for the chirp is not phase-continuous, i.e. the phase of the waveform changes abruptly across each frequency transition.

Figure 10:
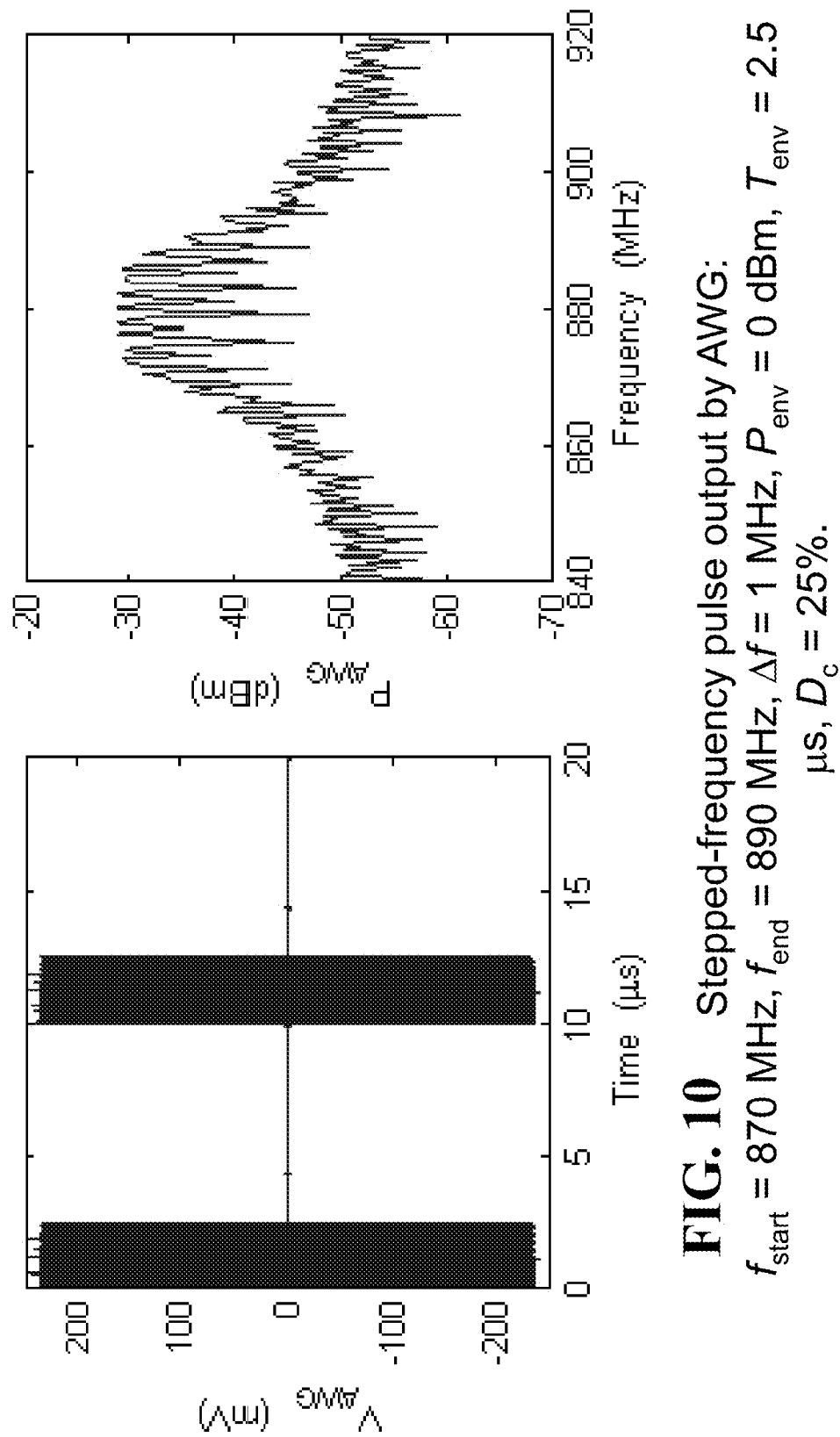

An example of a stepped-frequency chirp pulse is shown in FIG. 10. A Matlab function which generates this waveform is given in Appendix D.

Linear and Nonlinear Transceiver

An architecture having components common to both linear and nonlinear modes for transmitting and receiving radar waveforms is necessary to minimize the size, weight, and power of the combined radar system. A bench-top architecture for an alternate preferred embodiment combined radar transceiver is given in FIG. 11. However, the invention is not limited to the specific components of the bench-top architecture.

Figure 11:
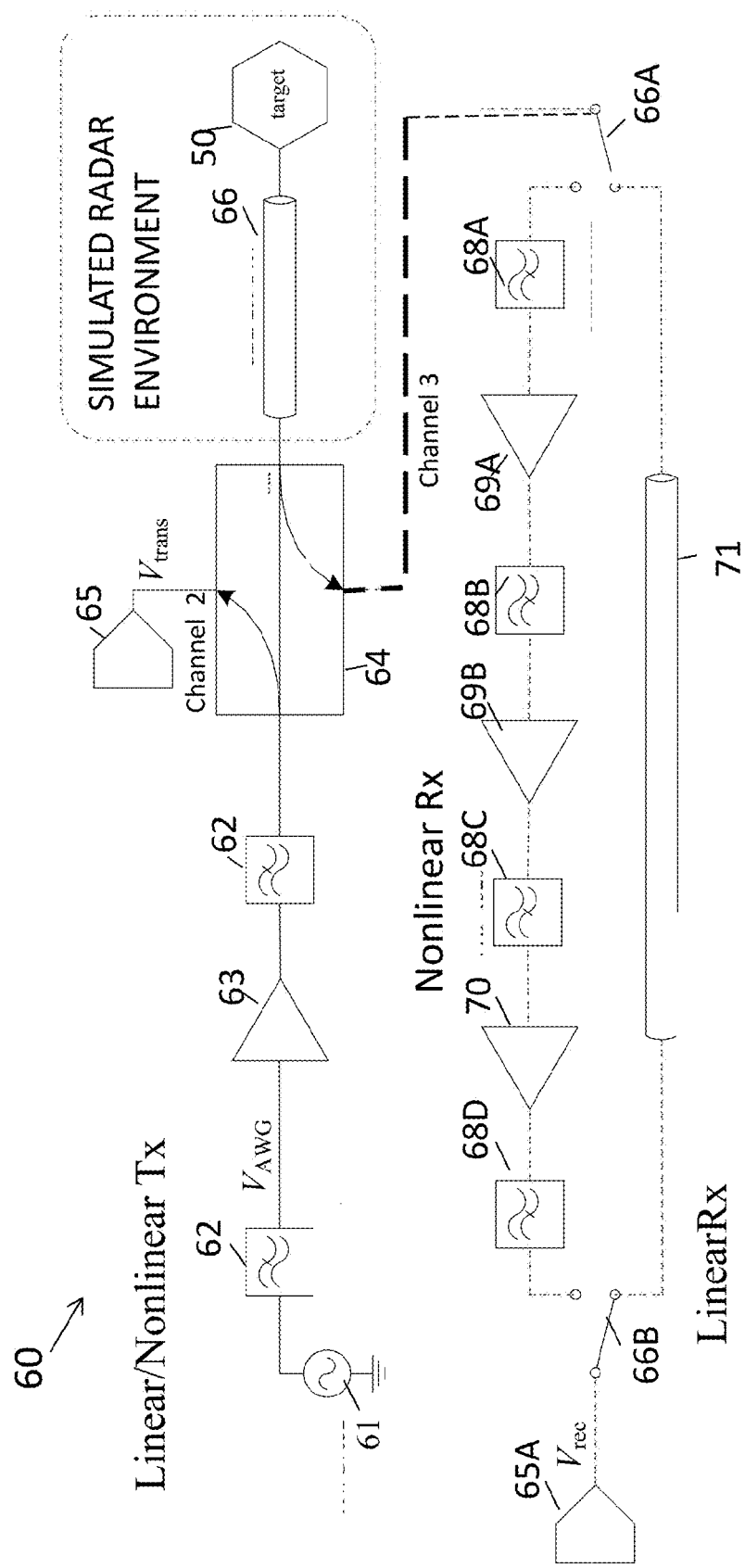
FIG. 11 is an illustration of an alternate preferred embodiment combined radar architecture where transmission from the radar and reception from the target is hardware simulated.

In this alternate preferred embodiment (which includes a hardware simulation of the radar environment), the signal generator 61 is both linear and nonlinear radar waveforms, which may be for example a Tektronix AWG7052. The low pass filters 62 (which may for example be MiniCircuits NLP-1000+ low-pass filters) are highly linear with a passband below 1 GHz and remove much of the transmitter (Tx)-generated nonlinear (harmonic) distortion. The amplifier 63, which may for example be a AR4W1000 amplifier, boosts the power of the AWG signal to a level sufficient to excite nonlinear responses from electronic targets. The dual-directional coupler 64, which may for example be a HP 778D, provides one port for sampling the forward transmit, Tx waveform (which may be monitored for example by a digital oscilloscope 65) and another port for sampling the reverse (receive, Rx) signal. The "Simulated Radar Environment" consists of 100 ft of SMA cable 66 (four 25-ft cables in series), terminated by an SMA-connectorized target 50A Two receive chains are selected by a pair of switches 66A, 66B, which may be examples be Hittite HMC784MS8GE switches. Each switch 66A, 66B may be powered by 5 V from the 6-V/5-A port on an Agilent E3631A supply and controlled by 5 V/0 V from the ±25-V/1-A port. In FIG. 11, the "Linear Rx" chain is selected, and the signal is passed directly to the oscilloscope 65A through an SMA cable 71. Alternatively, the "Nonlinear Rx" chain may be selected. Along the nonlinear receiver path, the signal is filtered by four high-pass filters 68A-68D (which may be for example MiniCircuits VHF-1320+ high-pass filters having passbands above 1.32 GHz), to remove the linear response from capture and processing) and amplified by amplifiers 69A, 69B (which may for example be two MiniCircuits PSA-5453+) and amplifier 70, which may for example be a MiniCircuits PSA-545+. Each amplifier is mounted on an evaluation board and powered by 3 V from another E3631A supply.

RF Signal Generation and Capture

Figure 12:
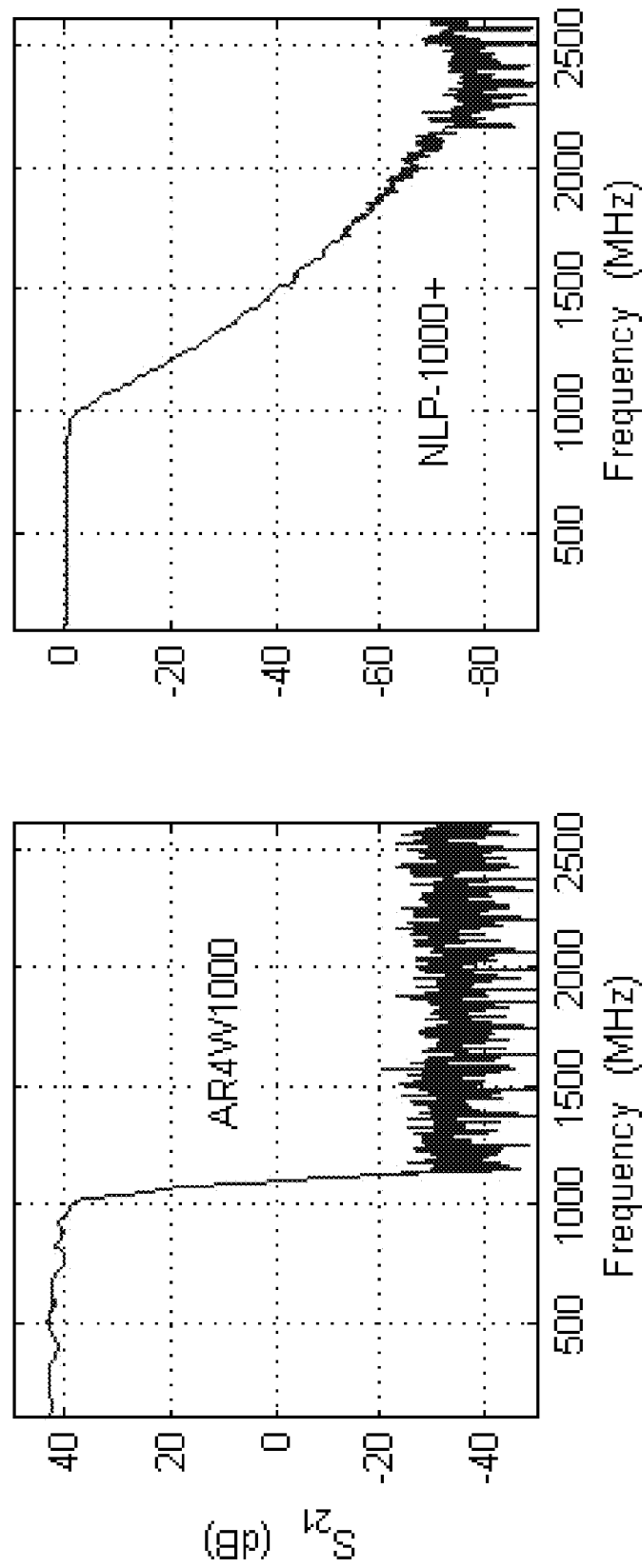
FIG. 12 is an illustration showing electromagnetic properties of the transmitter amplifier and low-pass filters.

As measured by an Agilent N9923A network analyzer and observed in FIG. 12, the amplifier 63 (AR4W1000) provides more than a 40-dB gain to the transmit signal. For nonlinear (harmonic) responses, each NLP-1000+ filter (62) attenuates Tx-generated distortion at frequencies above 1500 MHz by more than 40 dB. FIG. 12 is an illustration showing the signal at the transmitter amplifier 63 and low-pass filters 62

Figure 13:
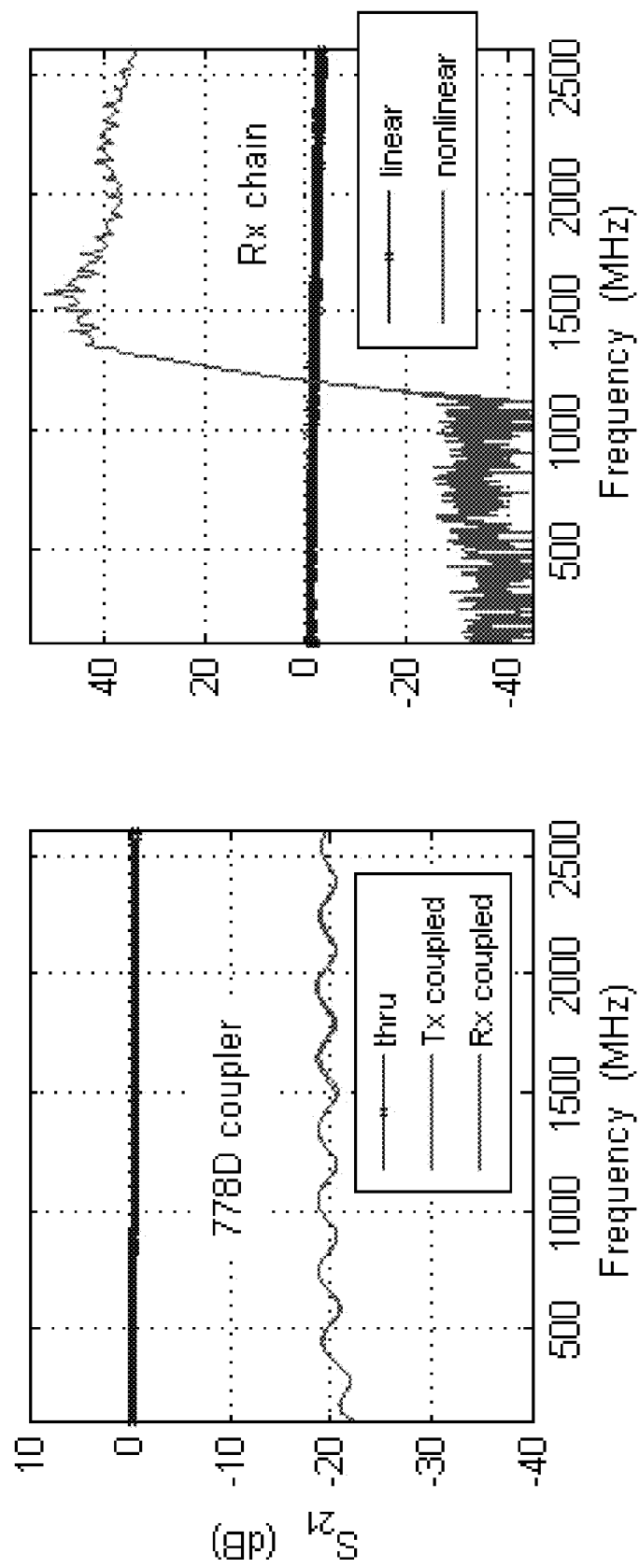
FIG. 13 is an illustration showing electromagnetic properties of the directional coupler and linear/nonlinear receiver chain.

As seen in FIG. 13, illustrating signals relating to the directional coupler and linear/nonlinear receive chain, the Tx and Rx coupling from the 778D is approximately 20 dB. Also, the nonlinear Rx chain (measured from one HMC784 "RF common" port to the other) passes signals to the 8300A with a gain of approximately 40 dB, whereas the linear Rx chain passes signals through with a loss under 3 dB.

MATLAB Graphical User Interface

The AWG7052 generator 61, 8300A oscilloscope 65, and E3631A supplies are controlled via the General Purpose Interface Bus (GPIB). Communication is established using the Instrument Control Toolbox in MATLAB (v7.0.0.19920, R14). An example of a graphical user interface (GUI) for the combined-radar system is illustrated in FIG. 14 and was created using MATLAB's "guide" function. The script and functions that govern the operation of the GUI are given in appendices E through K.

Using the upper panel as shown in FIG. 14, the four different waveforms presented in FIGS. 7-10 may be uploaded to the arbitrary wave generator 61 for transmission to the target. Using the lower panel as shown in FIG. 14, the signal from the target may be captured using the linear or nonlinear receive chain and processed accordingly. For the single-tone pulse, the user may choose the power of the RF pulse while it is active ($P_{env}$), the RF frequency ($f_{pulse}$), the time interval during which the pulse is active ($T_{env}$), and the pulse duty cycle ($D_c$). The "waveform name" is the designation that appears on the AWG after the waveform is uploaded and is selected for waveform playback.

For the linear FM chirp pulse, the user may choose the power of the chirp envelope ($P_{env}$), the frequency at which the chirp starts ($f_{start}$), the frequency at which the chirp ends ($f_{end}$), the time interval during which the frequency linearly changes from $f_{start}$ to $f_{end}$ ($T_{env}$), and the duty cycle of the waveform (Dc).

For the multitone pulse, the user may choose the number of tones (N), power per tone ($P_{tone}$), the frequency at which the tones are centered ($f_c$), the time interval during which the pulse is active ($T_{env}$), and the pulse duty cycle ($D_c$). The frequency separation between the tones ($f_{space}$) is automatically set to $1/T_{env}$, so that the shortest waveform necessary to achieve N,$f_c$, and $T_{env}$ with negligible frequency aliasing is uploaded to the AWG.

For the stepped-frequency waveform, the user may choose the power of the pulse envelope ($P_{env}$), the frequency at which the stepping starts ($f_{start}$), the frequency at which the stepping ends ($f_{end}$), the time interval during which the frequency steps from $f_{start}$ to $f_{end}$ ($T_{env}$), the step size ($\Delta f$), and the duty cycle of the waveform ($D_c$).

As depicted in FIG. 11, the sampled Tx signal is fed to channel 2 of the 8300A oscilloscope 65, and the sampled Rx signal is fed (through the linear/nonlinear receive chain) to channel 3. The user chooses the voltage scale per channel, the total data collection time per trace, and the number of integrations (i.e., the number of data traces averaged before capture).

The user chooses the trigger level and source for signal capture with a consistent time reference. In the experimental setup, Marker 1 from the arbitrary waveform generator 61 is fed to the External trigger port on the oscilloscope 65.

The user chooses the receiver (Rx) mode and types a name for the native MATLAB (MAT) file that will store the time-sampled Tx and Rx voltage vectors.

Upon pressing the "Upload . . . " button inside of one of the upper subpanels, the appropriate waveform is generated and sent to the arbitrary waveform generator 61. A new figure panel (not shown) appears, which plots the software-generated waveform in frequency and time to confirm that the signal the user intended has been uploaded.

Upon pressing the "Capture . . . " button inside the lower subpanel, the corresponding signal received from the target is recorded by the oscilloscope and processed in MATLAB. A second figure panel (shown in section 4) appears, which plots the raw Tx and Rx data in time. A third figure panel (also shown in the following Wireline Experiments section) appears, which plots the correlation of the Tx and Rx voltage samples.

Wireline Experiments

Several experiments were conducted in order to demonstrate the performance of the alternate preferred embodiment combined-radar transceiver 60 using three different waveforms (pulse, linear chirp, stepped-frequency), two Rx modes (linear and nonlinear), two hardware-simulated linear targets (open-circuit, matched load), and one hardware-simulated nonlinear target (Family Radio Service [FRS] radio).

Linear Rx, Chirp Waveform, Open-Circuit Target

Figure 15A:
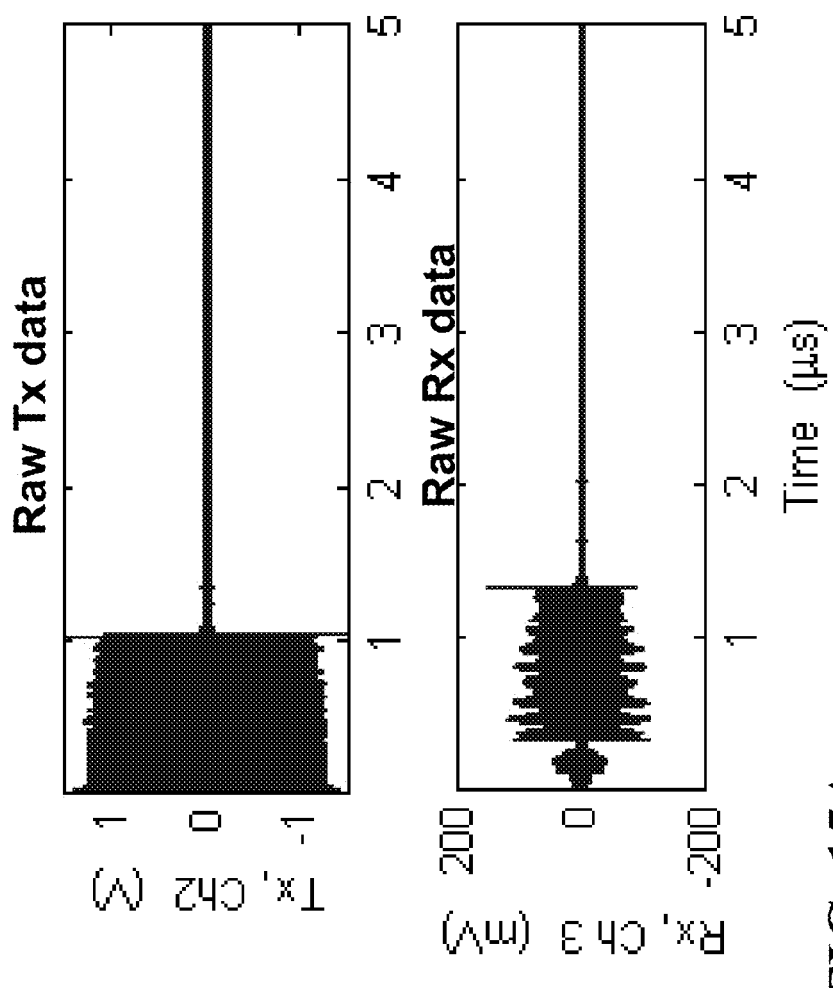
FIG. 15A illustrates a plot of the raw Tx and Rx data from the preferred embodiment of FIG. 11 showing the result of linear data capture and processing when reflecting a chirp from a simulated radar target, in this case an open circuit.
Figure 15B:
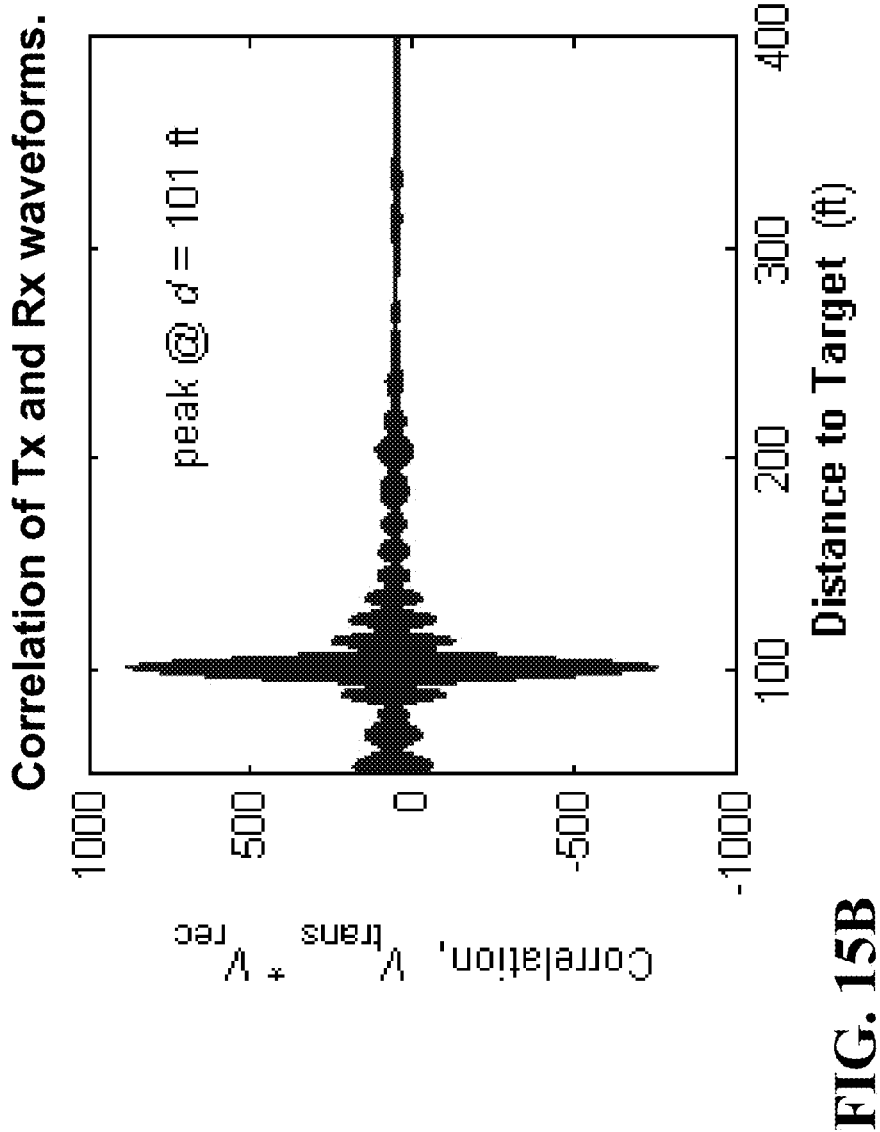
FIG. 15B illustrates a plot of the correlation of Tx and Rx waveform data shown in FIG. 15A.

FIG. 15A illustrates a plot of the raw Tx and Rx data from the preferred embodiment of FIG. 11 showing the result of linear data capture and processing when reflecting a chirp from a hardware-simulated highly-reflective linear target, in this case an open circuit. The specifications for FIGS. 15A, 15B are: Radar data, chirp Tx waveform, linear Rx mode, open-circuit target: fstart=880 MHz, fend=920 MHz, Penv=0 dBm, Tenv=1 Dc=10%. FIG. 15B plots the cross correlation of the Tx and Rx signals (of FIG. 15A):

$$[V_{trans}*V_{rec}](t)=\int_{-\infty}^{+\infty} V_{trans}(t) \cdot V_{rec}(t+\tau)d\tau \qquad (22)$$

where time has been mapped to distance using the velocity of propagation of an RF signal in the MiniCircuits CBL-25FT coaxial lines (dielectric constant $\epsilon_r \approx 2.1$):

$$d = \frac{1}{2} \cdot t \cdot \frac{c}{\sqrt{\epsilon_r}} = \left(\frac{t}{2}\right)\left(\frac{3 \cdot 10^8 \text{m/s}}{\sqrt{2.1}}\right)\left(\frac{3.28 \text{ ft}}{1 \text{ m}}\right) = \left(0.34 \frac{\text{ft}}{\text{ns}}\right)t. \qquad (23)$$

A factor of ½ is used in equation (23) because the distance plotted is half the round-trip distance from the transmitter (i.e. from the coupler output port) to the target (i.e. to the end of the 100-ft coaxial line) to the receiver (i.e. back to the coupler output port).

Cross-correlation is a basic form of target ranging. The peak of $V_{trans}*V_{rec}$ (as a function of distance) indicates the distance from the transmitter to the target.

In FIG. 15A, a relatively constant-amplitude pulse is visible in the sampled Tx channel, and a distorted pulse is visible in the sampled Rx channel. These waveforms are expected, given the frequency-dependent characteristic of the coupler in FIG. 13. In FIG. 15B, a sinc function is visible along with several sidelobes. This shape is expected from the cross correlation of two chirps. The peak of the sinc function is visible at a distance of d=101 ft. The calculated distance is very close to the length of the coaxial line (and slightly higher because the calculation does not account for the length of the Rx chain).

Linear Rx, Chirp Waveform, Open Circuit Versus Matched Load

Figures 16A, 16B:
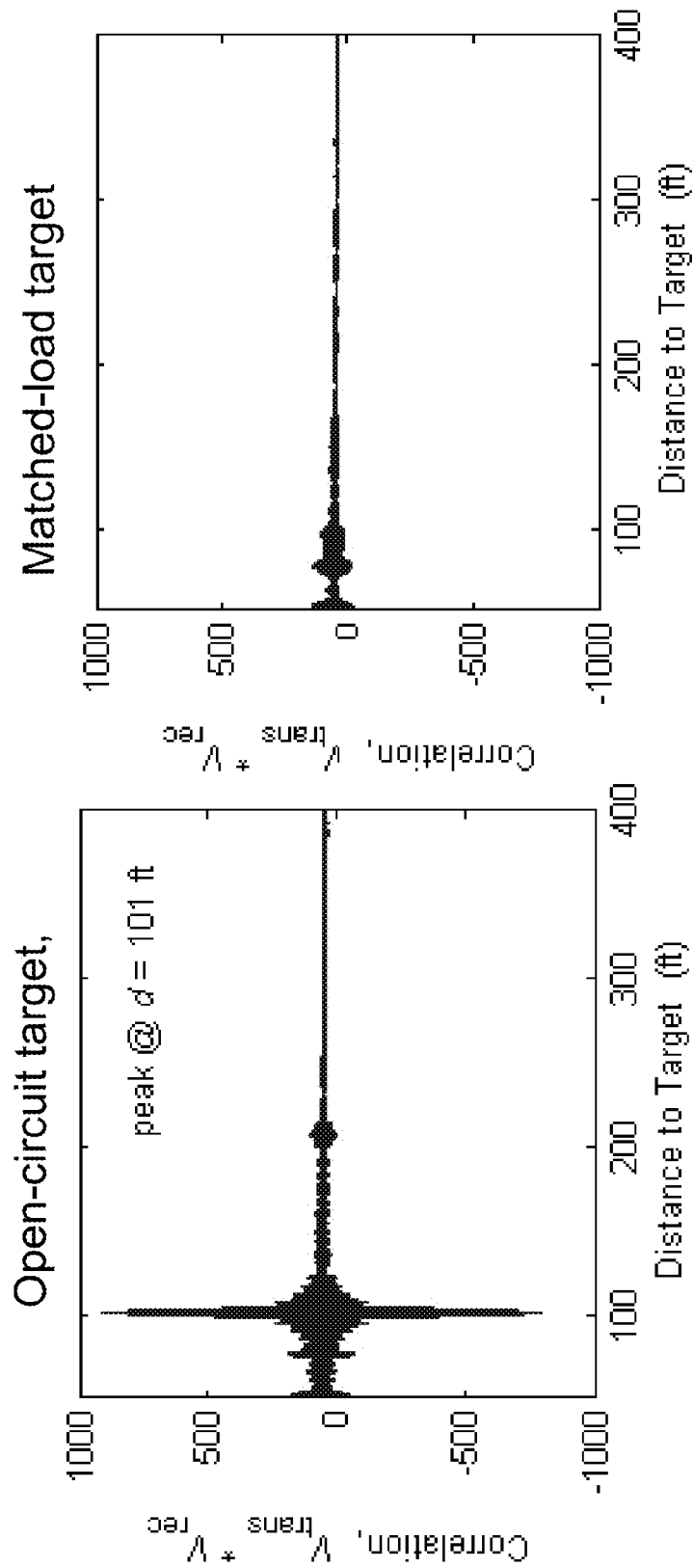
FIG. 16A illustrates the result of the cross-correlation when reflecting a chirp with a wider bandwidth than that of Linear Rx, Chirp Waveform from an open circuit (raw data, complete time scale).
FIG. 16B illustrates the correlation when receiving the same waveform in the absence of a radar target; minimal reflection is hardware-simulated with a matched (50-Ω) load (raw data, zoomed-in time scale).

FIG. 16A shows the result of the cross-correlation when reflecting a chirp with a wider bandwidth than that of Linear Rx, Chirp Waveform from a hardware-simulated highly-reflective linear target, in this case an open circuit. FIG. 16B illustrates the correlation when receiving the same waveform from a hardware-simulated absent target, in this case a matched (50-Ω) load. Two results are notable: (1) the peak is sharper when the bandwidth of the Tx waveform is wider, and (2) very little signal reflects from the matched load. Both results are expected and indicate proper operation of the transmitter and the linear receive chain. For FIGS. 16A. 16B the specifications are Radar data, chirp Tx waveform, linear Rx mode: fstart=860 MHz, fend=940 MHz, Penv=0 dBm, Tenv=1 μs (time interval during which the frequency steps from $f_{start}$ to $f_{end}$), Dc=10%, (FIG. 15 A open-circuit target, FIG. 15 B matched-load target).

Nonlinear Rx, Pulse Waveform, Nonlinear Target

Figure 17:
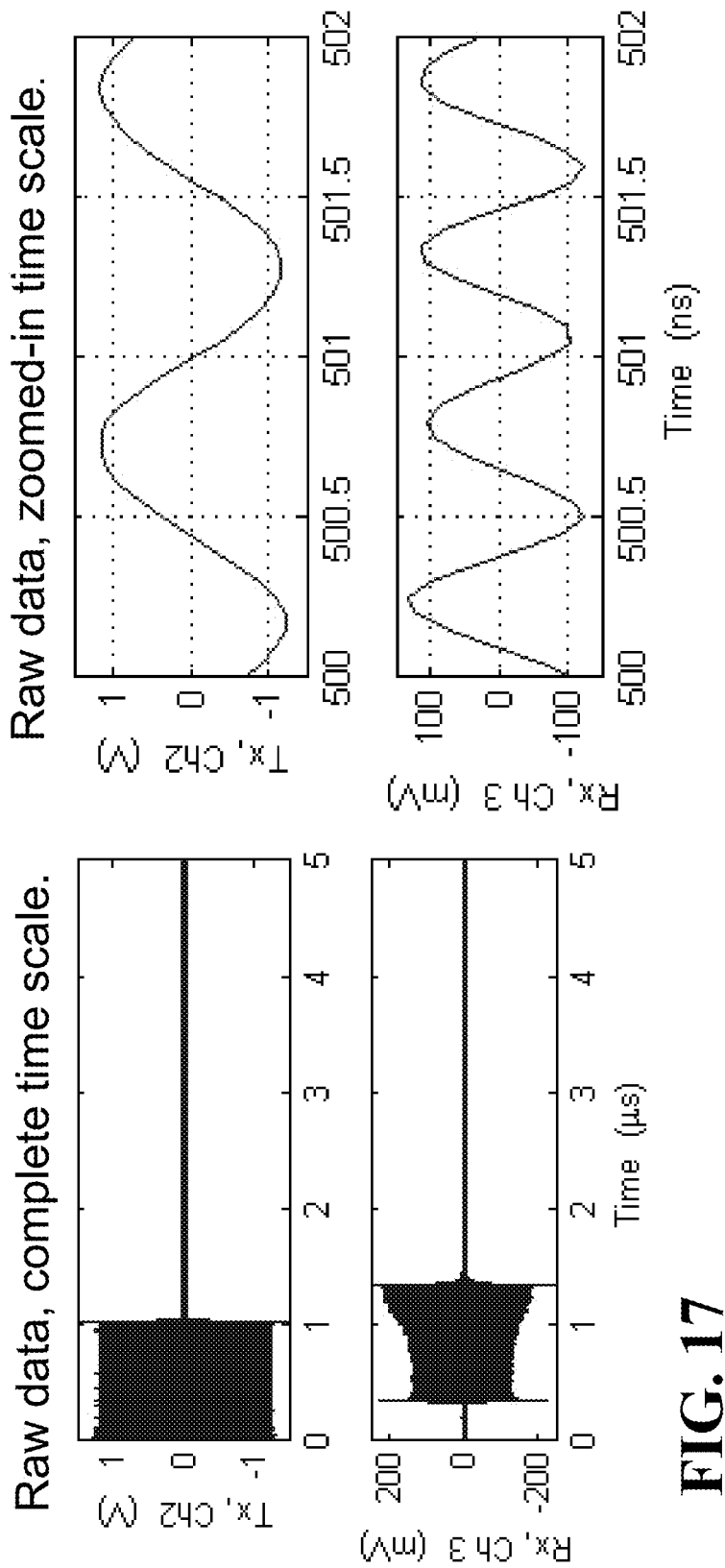
FIG. 17 illustrates the result of the nonlinear data capture (Radar data, RF pulse Tx waveform, linear Rx mode, FRS radio target: $f_{pulse}$=900 MHz, $P_{env}$=0 dBm, $T_{env}$=1 µs, $D_c$=10%) when reflecting an RF pulse from a hardware-simulated nonlinear target: a Motorola T4500 whose antenna has been replaced by an SMA end-launch connector. A 13-dB attenuator is placed between the end of the coaxial line and the FRS radio. The left side of FIG. 17 plots the raw Tx and Rx data along a 5-µs time scale. The right side plots the same raw data along a 2-ns time scale between t=500 ns and t=502 ns.

FIG. 17 shows the result of the nonlinear data capture when reflecting an RF pulse from a hardware-simulated nonlinear target: a Motorola T4500 whose antenna has been replaced by an SMA end-launch connector. The specifications for FIG. 17 are: Radar data, RF pulse Tx waveform, linear Rx mode, FRS radio target: $f_{pulse}$=900 MHz, $P_{env}$ 0 dBm, $T_{env}$=1 μs, $D_c$=10%. A 13-dB attenuator is placed between the end of the coaxial line and the FRS radio. The left side of FIG. 17 plots the raw Tx and Rx data along a 5-μs time scale. The right side plots the same raw data along a 2-ns time scale between t=500 ns and t=502 ns.

It is not apparent from FIG. 17 (left side) that the transceiver is detecting the nonlinear response from the target. In the right side of FIG. 17, however, the observed response is clearly nonlinear, because the frequency of the received signal (1800 MHz) is twice that of the transmitted signal (900 MHz).

Nonlinear Rx Stepped-Frequency Waveform, Nonlinear Target

Figure 18:
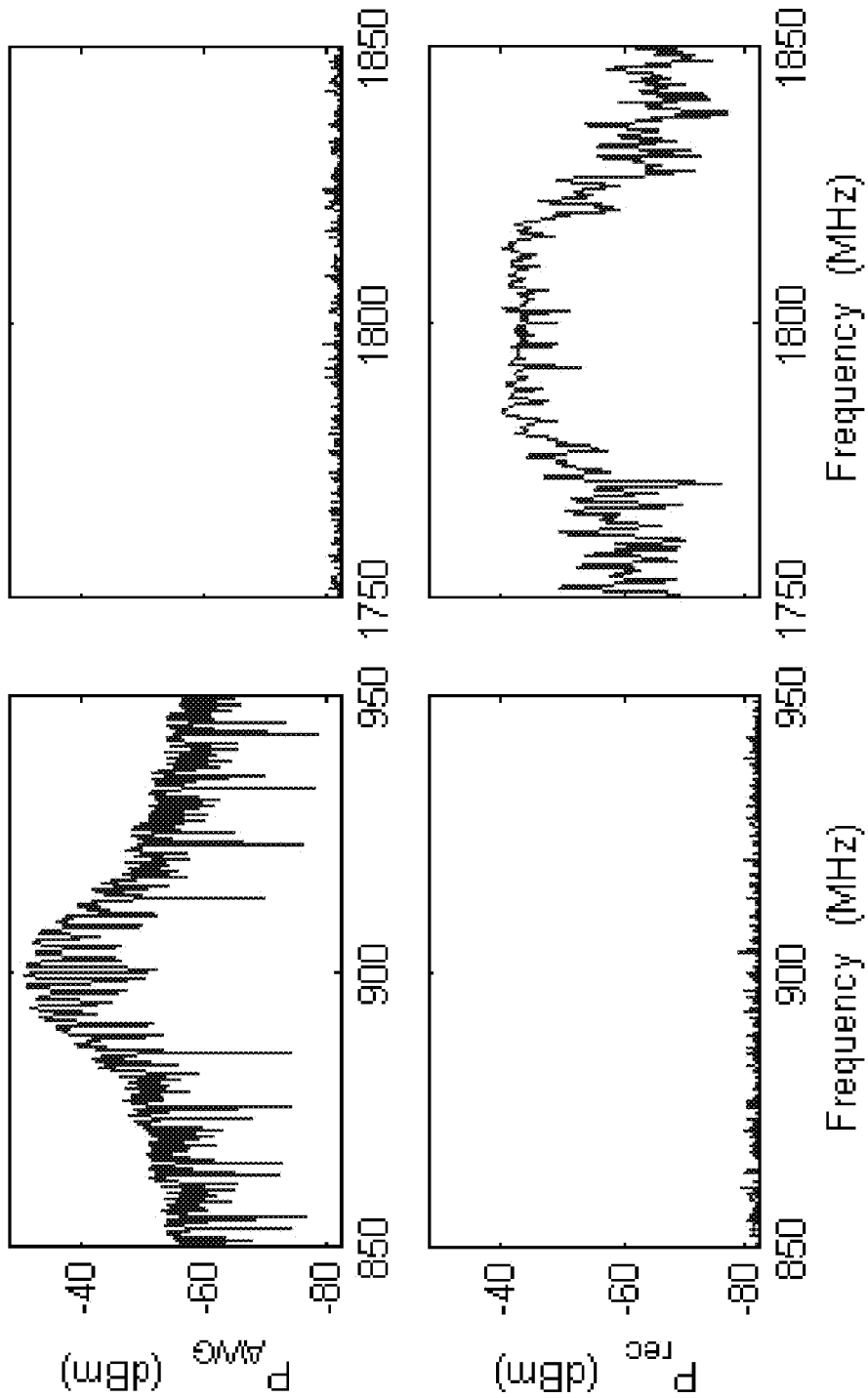
FIG. 18 illustrates plots for a stepped-frequency waveform and the FRS radio target.

Nonlinearity is also visible in the frequency domain when the Tx and Rx signals are captured with a spectrum analyzer. FIG. 18 provides such captures for a stepped-frequency waveform and the FRS radio. The signal output from the arbitrary waveform generator 61 and filtered by a NLP-1000+) is plotted above and the received spectrum is plotted below. For $P_{AWG}$, all of the spectral content is centered at f=900 MHz and no spectral content exists near 2f=1800 MHz. For $P_{rec}$, all of the spectral content is centered at 2f=1800 MHz and no spectral content exists near f=900 MHz.

Nonlinear Rx, Chirp Waveform, Nonlinear Target

Figure 19:
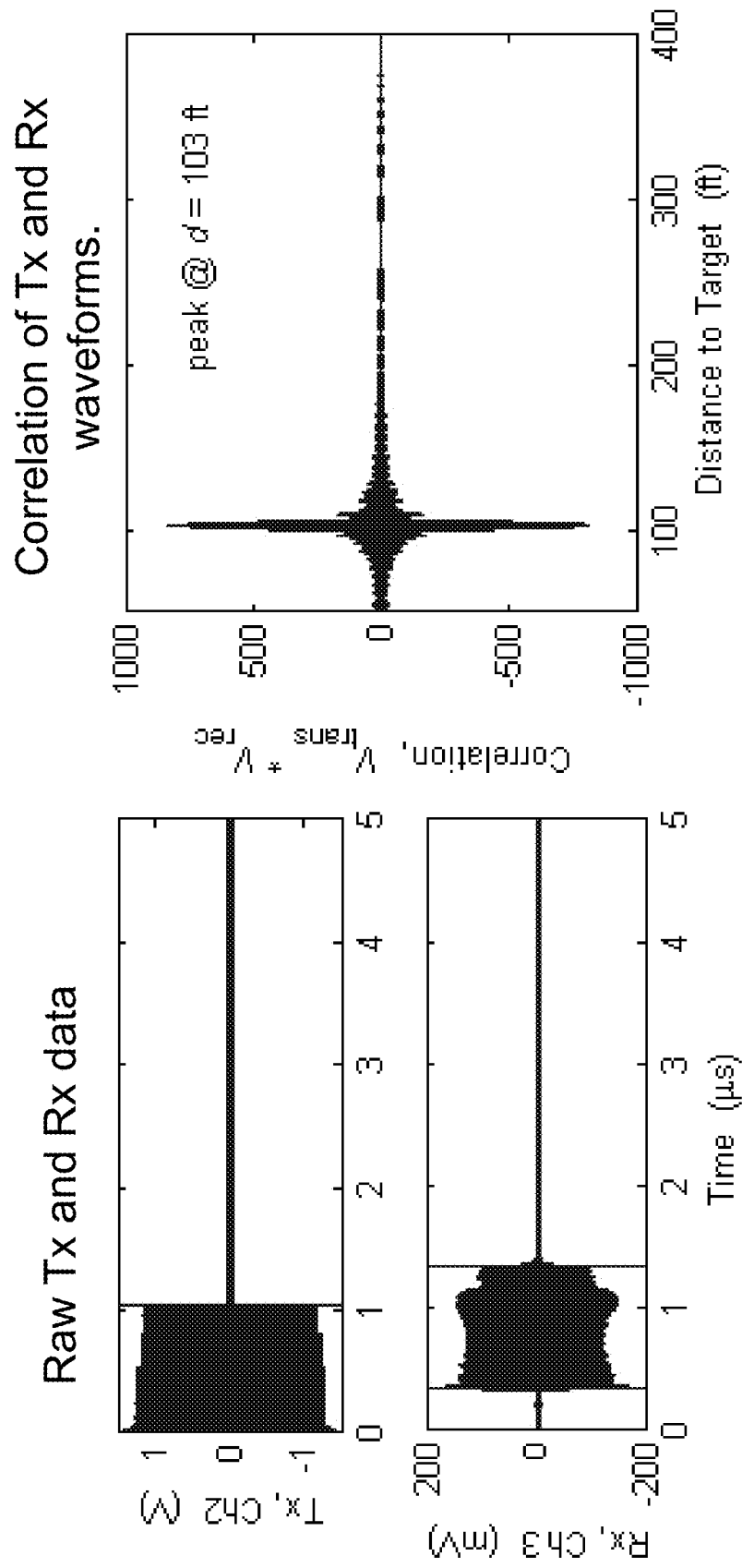
FIG. 19 illustrates a plot that shows the result of the nonlinear data capture and processing when reflecting a chirp from the FRS radio.

FIG. 19 shows the result of the nonlinear data capture and processing when reflecting a chirp from the FRS radio. FIG. 19 (left) plots the raw Tx and Rx data. FIG. 19 (right) plots the cross correlation of the Tx and Rx signals:

$$[V_{trans} * V_{rec}](t) = \int_{-\infty}^{+\infty} V'_{trans}(t) \cdot V_{rec}(t+\tau) d\tau \quad (22)$$

where the Tx signal used for the correlation is a filtered $2^{nd}$ harmonic of the captured $V_{trans}$:

$$V'_{trans}(t) = h_{BPF}(t) * V_{trans}^2(t) \quad (14)$$

and $h_{BPF}$ is a bandpass filter with passband edges $f_L=3f_c/2$ and $f_U=5f_c/2$ with $f_c=(f_{start}+f_{end})/2$. FIG. 19 illustrates the radar data results for a linear chirp Tx waveform, nonlinear Rx mode, FRS radio target, starting frequency $f_{start}$=880 MHz, ending frequency $f_{end}$=920 MHz, $P_{env}$0 dBm, $T_{env}$=1 μs, $D_c$=10%.

A sinc function is again visible, centered at d=103 ft. This distance is longer than d=101 ft measured previously because the nonlinear Rx chain contains slightly more propagation delay (through the filters and amplifiers) than the linear Rx chain (SMA cable, pass-through).

Nonlinear Rx Chirp Waveform, Nonlinear Vs. Open-Circuit Target

The nonlinear Rx chain was tested against a purely linear target in order to demonstrate that the transceiver does not indicate detection if the target is linear, and the radar is listening for a nonlinear response. FIG. 20 gives the result of this test, which is performed with a chirp waveform.

From FIG. 20 it is clear that the radar registers a detection (at d=103 ft) when the target is nonlinear and the Rx is expecting a nonlinear response. From FIG. 20 (right side, open circuit target) it is clear that the nonlinear Rx chain does not register a detection when the target is linear. FIG. 20 illustrates the radar data results for a chirp transmission waveform, nonlinear Rx mode, starting frequency $f_{start}$=890 MHz, ending frequency $f_{end}$=910 MHz, $P_{env}$=0 dBm, $T_{env}$=1 ms, $D_c$=10%.

From the above it can be concluded that the alternate preferred embodiment combined-radar transceiver enables basic target ranging in both linear and nonlinear (harmonic) receive modes. The transceiver was constructed using an arbitrary waveform generator 61 as the signal source, a high-speed digitizing oscilloscope 65A as the signal capture device, and commercial off-the-shelf (COTS) components for the radar front-end (amplification, filtering, and switching). A 100-ft length of SMA cable 66 terminated in an open circuit simulated a linear radar target; the same cable terminated in an SMA-connectorized FRS radio simulated a nonlinear radar target. A MATLAB GUI was developed in order to control the transceiver remotely. The associated script and helper functions are provided in the appendices. Ranging to the target was demonstrated experimentally using RF pulses, linear FM chirps, and stepped-frequency waveforms.

The preferred embodiment combines linear radar with nonlinear radar. Linear radar detects targets whose permittivity contrasts with that of the background media; detection is best when the physical dimensions of the target are near to or greater than the wavelength of the incident radiation. Nonlinear radar detects targets containing nonlinear junctions, regardless of physical size, whose RF properties convert incident radiation at a set of probe frequencies to reflected radiation at a set of completely different frequencies. The key advantage of the combined linear and nonlinear radar is that it detects both of these target sets. For a given transmitted wavelength $\lambda_{trans}$, the combined radar detects linear targets whose physical size is near to or greater than $\lambda_{trans}$ as well as nonlinear targets that can be much smaller than $\lambda_{trans}$.

State-of-the-art linear radars are able to detect mines and bulk explosives, objects in the path of a vehicle, and personnel. The Synchronous Impulse Reconstruction (SIRE) radar constructed at ARL implements a wideband impulse transmit waveform, multiple transmit and receive antennas, and signal processing which creates synthetic aperture images. To date, the SIRE radar has demonstrated standoff detection of metallic and dielectric surface targets whose volume is at least 200 in³ (see, for example M. Ressler, L. Nguyen, F. Koenig, D. Wong, and G. Smith, "The Army Research Laboratory (ARL) Synchronous Impulse Reconstruction (SIRE) forward-looking radar," in *Proc. SPIE*, pp. 656105(1-12), April 2007), buried dielectric targets whose volume is at least 1 ft$^3$, and people walking inside buildings.

State-of-the-art nonlinear radars detect semiconductor junctions such as those found in RF electronics. The combination of linear wideband and nonlinear narrowband technology enables a single radar to detect a variety of threats: targets that produce a linear response, targets that produce a nonlinear response, and targets that produce both. Some threats contain components whose permittivity contrasts substantially with that of the emplacement; such is the case with many threats that are buried. Reception of a subsurface linear radar response from an area whose surface is otherwise undisturbed indicates the presence of a threat. Others threats contain metal contacts and semiconductor junctions whose nonlinear electromagnetic response contrasts with that of the emplacement; such is the case with RF electronics. Reception of a nonlinear radar response from an area that does not otherwise contain electronics indicates the presence of another class of threat. The combined radar is intended to detect both types of threats, collocated or not.

Often, threats contain dielectric as well as electronic components; hence, they will respond to both linear and nonlinear excitation, as depicted in FIG. 5. Either mode (linear/nonlinear) of the preferred embodiments shown in FIGS. 4 and 11 will detect the threat. By switching between the two modes, additional information about the threat is received and thus the probability that it is detected is improved. By combining linear and nonlinear radar capabilities, several additional applications are evident including detection of landmines, weapons, and miscellaneous ordnance, subsurface mapping (of pipes, electrical wires, and other manmade structures), vehicle tracking and navigation (with or without nonlinear tags), through-the-wall personnel tracking (with nonlinear tags), and performing counter-surveillance.

Figure 4:
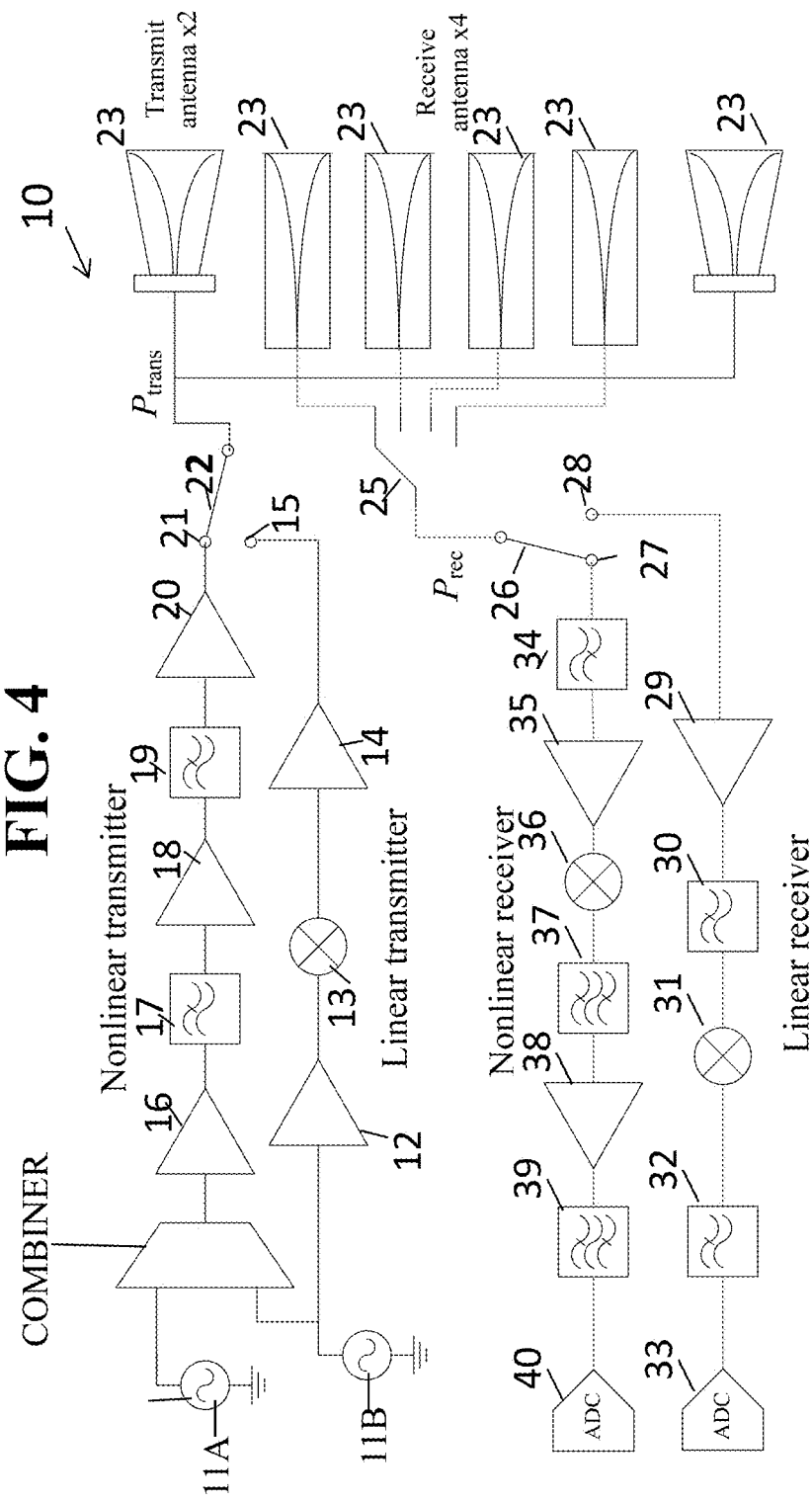
FIG. 4 is a schematic illustration of a preferred embodiment combined linear and nonlinear radar architecture.

The preferred embodiments of FIGS. 4 and 11 enable detection of targets whose permittivity contrasts substantially with that of the emplacement; such is the case with many threats that are buried. Another class of threats contains metal contacts and semiconductor junctions whose nonlinear electromagnetic response contrasts with that of the emplacement; such is the case with RF electronics. Linear radar is a detection technique well-suited for targets whose permittivity contrasts with that of the background media, and whose physical dimensions are near to or greater than the wavelength of the incident radiation. Nonlinear radar is another technique, well-suited for detecting targets containing electronics, regardless of physical size, whose RF properties convert incident radiation at a set of probe frequencies to reflected radiation at a different set of frequencies. The preferred embodiments FIGS. 4 and 11 combine linear and nonlinear radar so as to detect a set of targets greater than either radar can detect alone. The preferred embodiments FIGS. 4 and 11 enable reception of a subsurface linear radar response or nonlinear from an area whose surface is otherwise undisturbed so as to indicate the presence of a threat. By switching between the linear and nonlinear radar modes, either type of threat is detected. For targets that contain both linear and nonlinear components, switching between the two radar modes provides additional information and the probability of detection is improved.

Obviously, many modifications and variations of the present invention are possible in light of the above teachings. It is therefore to be understood that, within the scope of the appended claims, the invention many be practiced otherwise than as specifically described.

What is claimed is:

1. A radar assembly for linear and nonlinear radar transmission and reception comprising:
    a transmitter for transmitting radar signals; the transmitter comprising:
        at least one signal generator;
        at least one filter operatively connected to the signal generator;
    a receiver operative to receive signals comprising linear and nonlinear responses from reflected transmitted signals; the receiver comprising:
        a first channel configured to process the linear response from the received signal;
        a second channel configured to process the nonlinear response from the received signal, wherein the second channel comprises at least one high pass filter configured to attenuate the linear response and at least one amplifier operatively connected to the at least one high pass filter and configured to amplify the nonlinear response;
    at least one switch operative to select one of the first or second channels through the at least one switch;
    at least one analog-to-digital converter for converting the analog received signal to a digitized data stream, and
    at least one display operatively connected to both the first and second channels for displaying both the linear and nonlinear responses.

2. The assembly of claim 1 wherein the at least one signal generator comprises first and second signal generators, and wherein the first and second signal generators are operatively connected to third and fourth channels, the third channel comprising a signal combiner.

3. The assembly of claim 1 wherein the transmitter is configured to transmit at radio frequencies common to the excitation of both linear and nonlinear responses from targets.

4. The assembly of claim 1 wherein the at least one signal generator is configured to generate signal wave forms for both linear and nonlinear radar waveforms.

5. The assembly of claim 1 wherein the assembly is configured to operate in linear and nonlinear modes, whereby the at least one switch operates to switch between the linear and nonlinear modes.

6. The assembly of claim 1 wherein the signal generated by the at least one signal generator is one of a single-tone pulse and a modulated chirp pulse having a carrier frequency that begins at a first frequency and increases linearly over a predetermined time interval.

7. The assembly of claim 1 wherein the signal generated by the at least one signal generator is a stepped-frequency chirp pulse.

8. The assembly of claim 1 wherein the transmitter is operatively connected to a transmitter antenna and wherein the receiver is operatively connected to a receiver antenna.

9. The assembly of claim 1 wherein the at least one filter comprises a low-pass filter to remove self-generated nonlinear distortion and wherein at least one second amplifier is connected to the at least one filter to boost the power of the signal generated by the signal generator to excite nonlinear responses from a target.

10. A radar assembly for linear and nonlinear radar transmission and reception comprising:
    a transmitter for transmitting radar signals, the transmitter comprising;

a signal generator;
at least one first filter operatively connected to at least one signal generator;
at least one first amplifier operatively connected to the at least one filter;
a receiver operative to receive the received signals comprising linear and nonlinear responses from reflected transmitted signals; the receiver comprising:
a first channel configured to process the linear response from the received signal;
a second channel configured to process the + nonlinear response from the received signal, wherein the second channel comprises at least one high pass filter configured to attenuate the linear response and at least one second amplifier operatively connected to the at least one high pass filter and configured to amplify the nonlinear response;
at least one switch operative to select one of the first or second channels through the at least one switch; and
at least one display operatively connected to both the first and second channels for displaying both the linear and nonlinear responses.

11. The assembly of claim 10 wherein the at least one first filter, the at least one first amplifier and the at least one transmitter operate to process both linear and nonlinear radar signals.

12. The assembly of claim 10 wherein the transmitter is operatively connected to a transmitter antenna and wherein the receiver is operatively connected to a receiver antenna.

13. The assembly of claim 10 wherein the signal generator is configured to generate both linear and nonlinear radar waveforms.

14. The assembly of claim 13 wherein the signal generator is configured to generate a single-tone pulse that can be represented by $$V_{AWG} = A_{env} \cos(2\pi f_{pulse} \cdot t) s(t)$$

with a carrier frequency $f_{pulse}$, an amplitude $A_{env}$ and the pulse modulation is given by the switching waveform s(t):

$$s(t) = u(t) - u(t - D_c T) = s(t+T) D_c T = T_{env}$$

where T is the period and $D_c$ is duty cycle, and the pulse is active during the time interval $T_{env}$.

15. The assembly of claim 13 wherein the signal generator is configured to generate a linear frequency-modulated chirp pulse having a carrier frequency that begins at a first frequency and increases linearly over a predetermined time interval.

16. The assembly of claim 13 wherein the signal generator is configured to generate a stepped-frequency chirp pulse having a carrier frequency that steps between discrete values that can be represented by $$V_{AWG} = A_{env} \cos[2\pi \cdot f(t) \cdot t] s(t)$$

$$f(t) = \begin{cases} f_{start} & 0 \le t < \Delta t \\ f_{start} + \Delta f & \Delta t \le t < 2\Delta t \\ f_{start} + 2\Delta f & 2\Delta t \le t < 3\Delta t \\ \ldots & \ldots \\ f_{start} - \Delta f & T_{env} - \Delta t \le t < T_{env} \end{cases} \quad \Delta t = \frac{T_{env}}{N_{steps}}$$

where $V_{AWG}$ is the output of the signal generator, t is time, $N_{steps}$ is the number of steps, $T_{env}$ is the length of the stepped-frequency chirp, $A_{env}$ is the amplitude of the chirp, $\Delta f$ is the spacing in frequency between each step, and $\Delta t$ is the spacing in time between each step and wherein the pulse modulation can be represented by the switching waveform s(t):

$$s(t) = u(t) - u(t - D_c T) = s(t+T) D_c T = T_{env}$$

which has a period T and a duty cycle $D_c$, and the pulse is active during the time interval $T_{env}$.

17. The assembly of claim 10 wherein the at least one first filter comprises a low-pass filter configured to remove self-generated nonlinear distortion and wherein the at least one first amplifier is operatively connected to the at least one first filter to boost the power of the signal generated by the signal generator to excite nonlinear responses from a target.

18. A radar assembly for linear and nonlinear radar transmission and reception comprising:
a base;
a transmitter operatively connected to the base configured to transmit linear and nonlinear radar signals;
a receiver configured to receive signals comprising linear and nonlinear responses from reflected transmitted signals, the receiver being operatively connected to one of the base or transmitter;
the transmitter configured to transmit linear radar signals in a first mode and nonlinear radar signals in a second mode, and the receiver configured to receive linear responses from the reflected transmitted signals in the first mode and nonlinear responses from the reflected transmitted signals in the second mode;
at least one antenna operatively connected to the receiver and the transmitter; and
at least one switch operatively connected to the receiver and configured to select between a first channel configured to process the linear response and a second channel configured to process the nonlinear response.

19. The radar assembly of claim 18 wherein the receiver and transmitter are mounted on the base, and wherein the transmitted radar signals are reflected by targets that reflect linear radar signals and targets that reflect nonlinear radar signals.

20. The radar assembly of claim 18 wherein the transmitter comprises a linear radar transmitter portion and a nonlinear radar transmitter portion and the at least one antenna is alternately connected to the linear and nonlinear radar transmitter portions by the at least one switch; and wherein the receiver comprises a linear radar receiver portion and a nonlinear radar receiver portion and the at least one antenna is alternately connected to the linear and nonlinear radar receiver portions by the at least one switch.

* * * * *